United States Patent
Gillard et al.

(10) Patent No.: US 9,706,135 B2
(45) Date of Patent: Jul. 11, 2017

(54) METHOD AND APPARATUS FOR GENERATING AN IMAGE CUT-OUT

(71) Applicant: Sony Corporation, Minato-ku (JP)

(72) Inventors: Clive Henry Gillard, Alton (GB); Stephen Mark Keating, Reading (GB); Robert Mark Stefan Porter, Winchester (GB)

(73) Assignee: Sony Corporation, Tokyo (JP)

( * ) Notice: Subject to any disclaimer, the term of this patent is extended or adjusted under 35 U.S.C. 154(b) by 286 days.

(21) Appl. No.: 14/177,512

(22) Filed: Feb. 11, 2014

(65) Prior Publication Data
US 2014/0300644 A1 Oct. 9, 2014

(30) Foreign Application Priority Data

Apr. 4, 2013 (GB) .................................. 1306050.4
Sep. 10, 2013 (GB) .................................. 1316102.1

(51) Int. Cl.
*H04N 5/262* (2006.01)
*H04N 5/232* (2006.01)
(Continued)

(52) U.S. Cl.
CPC .............. *H04N 5/265* (2013.01); *G06T 3/00* (2013.01); *G06T 15/20* (2013.01); *H04N 5/23238* (2013.01); *H04N 5/2628* (2013.01)

(58) Field of Classification Search
CPC  G06T 3/40; G06T 3/00; G06T 3/0006; G06T 15/205; H04N 5/23238; H04N 5/2628; H04N 5/265
See application file for complete search history.

(56) References Cited

U.S. PATENT DOCUMENTS 8,016,653 B2 * 9/2011 Pendleton ............... A63F 13/10
                                                        463/31
8,391,641 B2   3/2013 Porter
(Continued)

FOREIGN PATENT DOCUMENTS

JP        2011-248630        12/2011

OTHER PUBLICATIONS

Horry, Tour Into the Picture: Using a Spidery Mesh Interface to Make Animation from a Single Image, 1997, The Association for Computing Machinery, Inc.*

(Continued)

*Primary Examiner* — Jacinta M Crawford
*Assistant Examiner* — Phuc Doan
(74) *Attorney, Agent, or Firm* — Oblon, McClelland, Maier & Neustadt, L.L.P.

(57) ABSTRACT

A method of generating a cut-out from an image of a scene which has been captured by a camera is described. The method comprises: defining the position of a virtual camera, the image plane of the virtual camera being the cut out, with respect to the position of the camera capturing the scene; defining a set of pixel positions for the cut out of the captured image; generating a virtual camera rotation matrix to be applied to the defined set of pixel positions, the virtual camera rotation matrix expressing a combination of at least one of the yaw, pitch and roll of the virtual camera; applying the virtual camera rotation matrix to the defined set of pixel positions to determine a corresponding transformed pixel position for each of the defined pixel positions, the transformed pixel positions defining a shape and position of a portion of the captured image of the scene; mapping each of the transformed pixel positions in the set of transformed pixel positions to an associated pixel in the portion of the image of the scene; and establishing a value for each one of (Continued)

pixels of the image cut out in the defined pixel positions corresponding to the transformed pixel positions using the value of the corresponding associated pixel in the portion of the image of the scene which has been determined.

17 Claims, 19 Drawing Sheets

(51) Int. Cl.
    *G06T 3/00*         (2006.01)
    *G06T 3/40*         (2006.01)
    *H04N 5/265*       (2006.01)
    *G06T 15/20*       (2011.01)

(56) References Cited

U.S. PATENT DOCUMENTS

| | | | | |
|---|---|---|---|---|
| 2004/0150726 A1* | 8/2004 | Gallagher | ............... | G06T 5/00 |
| | | | | 348/222.1 |
| 2011/0052093 A1* | 3/2011 | Porter | ................ | G03B 37/04 |
| | | | | 382/284 |
| 2012/0232718 A1* | 9/2012 | Rischmuller | .......... | A63H 27/12 |
| | | | | 701/2 |
| 2012/0250980 A1 | 10/2012 | Gillard et al. | | |
| 2013/0163817 A1 | 6/2013 | Porter et al. | | |

OTHER PUBLICATIONS

Jain, Machine Vision, 1995, McGraw-Hill, Inc., ISBN 0-07-032018-7, Chapter 12.*
Bellas, Real-Time Fisheye Lens Distortion Correction Using Automatically Generated Streaming, 2009 17th IEEE Symposium on Field Programmable Custom Computing Machines.*
Hartley et al., Multiple View Geometry in Computer Vision, Cambridge University Press, 2004, Number of pp. 673.*
OpenCV, Camera Calibration and 3D Reconstruction, URL: http://docs.opencv.org/3.0-beta/modules/calib3d/doc/camera_calibration_and_3d_reconstruction.html, Jun. 25, 2011, pp. 1-38.*
U.S. Appl. No. 14/794,255, filed Jul. 8, 2015, Gillard.
U.S. Appl. No. 14/177,532, filed Feb. 11, 2014, Gillard, et al.

* cited by examiner

METHOD AND APPARATUS FOR GENERATING AN IMAGE CUT-OUT

BACKGROUND

Field of the Disclosure

The present disclosure relates to a method and apparatus.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

It is known to capture live events, such as sports events or concerts, using a camera whose position is fixed. On some occasions, although the location of the camera is fixed, the pitch, yaw and occasionally roll, of the camera is adjusted to follow the action within the live event. This is sometimes more desirable for the viewer as the viewer may concentrate on the relevant parts of the event.

On other occasions, the location and the pitch, yaw and roll of the camera is fixed. This arrangement is sometimes more desirable for the crew capturing the event as the camera does not require a camera operator. Also, fixed position mounting brackets are less expensive than the mounting brackets that allow pitch, yaw and roll operation of the camera.

It is therefore desirable to provide a system that allows the camera mounting to be fixed whilst allowing the viewer to concentrate on the relevant part of the event.

SUMMARY

According to one aspect, there is provided a method of generating a cut-out from an image of a scene which has been captured by a camera, the method comprising: defining the position of a virtual camera, the image plane of the virtual camera being the cut out, with respect to the position of the camera capturing the scene; defining a set of pixel positions for the cut out of the captured image; generating a virtual camera rotation matrix to be applied to the defined set of pixel positions, the virtual camera rotation matrix expressing a combination of at least one of the yaw, pitch and roll of the virtual camera; applying the virtual camera rotation matrix to the defined set of pixel positions to determine a corresponding transformed pixel position for each of the defined pixel positions, the transformed pixel positions defining a shape and position of a portion of the captured image of the scene; mapping each of the transformed pixel positions in the set of transformed pixel positions to an associated pixel in the portion of the image of the scene; and establishing a value for each one of pixels of the image cut out in the defined pixel positions corresponding to the transformed pixel positions using the value of the corresponding associated pixel in the portion of the image of the scene which has been determined.

The virtual camera rotation matrix may be calculated in accordance with a product of one or more of matrices associated with one or more of the pitch, yaw and roll of the virtual camera.

The virtual camera rotation matrix, V, may be given by:

$$V = P_V * Y_V * R_V$$

$$P_V = \begin{bmatrix} 1 & 0 & 0 \\ 0 & \cos\varphi_V & \sin\varphi_V \\ 0 & -\sin\varphi_V & \cos\varphi_V \end{bmatrix}$$

may be a pitch rotation matrix, the pitch being defined by an angle $\varphi_V$ about the x-axis;

$$Y_V = \begin{bmatrix} \cos\theta_V & 0 & -\sin\theta_V \\ 0 & 1 & 0 \\ \sin\theta_V & 0 & \cos\theta_V \end{bmatrix}$$

may be a yaw rotation matrix, the yaw being defined by an angle $\theta_V$ about the y-axis; and $$R_V = \begin{bmatrix} \cos\rho_V & \sin\rho_V & 0 \\ -\sin\rho_V & \cos\rho_V & 0 \\ 0 & 0 & 1 \end{bmatrix}$$

may be a roll rotation matrix, the roll being defined by an angle $\rho_V$ about the z-axis.

A defined pixel position for the cut out of the captured image may be given by $$s = \begin{bmatrix} s_x \\ s_y \\ s_z \end{bmatrix}$$

wherein $s_x$ and $s_y$ are normalised within a range determined by the ratio of the cut-out with the image of the scene and $s_z$ is determined in accordance with the focal length of the virtual camera $s_x$ may equal x-co-ordinate of the defined pixel position, normalised to be within the range $-n_x$-+$n_x$, wherein $$n_x = \frac{\text{width of cut out}}{\text{width of image of the scene}},$$

$s_y$ may equal y-co-ordinate of the defined pixel position, normalised to be within the range $-rn_x$-+$rn_x$, wherein $$r = \frac{\text{height of cut out}}{\text{height of image of the scene}},$$

and $s_z$ may equal $-F_V * n_x$, wherein $F_V$=focal length of virtual camera

The method may further comprise:

applying the virtual camera rotation matrix to the defined pixel position, s, so as to obtain a transformed pixel position, given by $$c = \begin{bmatrix} c_x \\ c_y \\ c_z \end{bmatrix};$$

and processing the transformed pixel position, c, so as to map the transformed pixel position onto two-dimensional space, the two-dimensional mapped pixel position given by $$c' = \begin{bmatrix} c'_x \\ c'_y \end{bmatrix}$$

wherein $c_x'$ and $c_y'$ are determined in accordance with focal length of the camera capturing the scene.

$c'_x$ may equal $\frac{c_x}{c_z} * -F_C =$ x-co-ordinate of the two-dimensional mapped pixel position, normalised to be within the range −1-+1, wherein $F_C$=focal length of the camera capturing the scene, and $c'_y$ may equal $\frac{c_y}{c_z} * -F_C =$ y-co-ordinate of the two-dimensional mapped pixel position, normalised to be within the range $-a - +a$, wherein $a = \frac{\text{height of image of the scene}}{\text{width of image of the scene}};$ wherein $F_V$ and $F_C$ are defined in units such that they are equal to one for a field of view of 90 degrees.

The focal length of the camera capturing the scene, $F_C$, may be obtained from lens metadata.

The yaw $\theta_V$ and pitch $\phi_V$ of the virtual camera may be controlled by a user operated controller.

The yaw $\theta_V$ and pitch $\phi_V$ of the virtual camera may be controlled by an object tracking algorithm configured to track an object in the captured image of the scene.

The roll $\rho_V$ of the virtual camera may be calculated in accordance with the angle of pitch of the camera capturing the scene about a predetermined pitch axis and the angle of roll of the camera capturing the scene about a predetermined camera roll axis.

The angle of the pitch and/or roll of the camera may be determined from a rig upon which the camera capturing the scene is mounted.

The roll $\rho_V$ of the virtual camera may be calculated using the equation:

$\rho_V = \sin^{-1}(\sin(\theta_V) * \sin(\phi_V + \phi_{rig})) + \rho_{rig}$ wherein $\phi_{rig}$ defines an angle of pitch of the camera capturing the scene about a predetermined camera pitch axis and $\rho_{rig}$ defines an angle of roll of the camera capturing the scene about a predetermined camera roll axis, the predetermined first camera pitch and roll axes defining a horizontal plane in the scene.

The method according may further comprise: generating the captured image of the scene as a stitched image captured by a first camera in a first position and a second camera in a second position, the second position being different from the first position.

The cut-out may be corrected for barrel and/or pin cushion distortion in the captured image using lens metadata associated with the camera capturing the image.

The captured image may be captured using a fish-eye lens and may be an image comprising fish-eye distortion. The transformed pixel positions defining the shape and position of the portion of the captured image of the scene may further transformed so that the shape of the portion of the captured image more closely matches a shape of an object in the fish-eye distorted captured image.

According to another aspect, there is provided a device for generating a cut-out from an image of a scene which has been captured by a camera, the device comprising circuitry configured to: define the position of a virtual camera, the image plane of the virtual camera being the cut out, with respect to the position of the camera capturing the scene; define a set of pixel positions for the cut out of the captured image; generate a virtual camera rotation matrix to be applied to the defined set of pixel positions, the virtual camera rotation matrix expressing a combination of at least one of the yaw, pitch and roll of the virtual camera; apply the virtual camera rotation matrix to the defined set of pixel positions to determine a corresponding transformed pixel position for each of the defined pixel positions, the transformed pixel positions defining a shape and position of a portion of the captured image of the scene; map each of the transformed pixel positions in the set of transformed pixel positions to an associated pixel in the portion of the image of the scene; and establish a value for each one of pixels of the image cut out in the defined pixel positions corresponding to the transformed pixel positions using the value of the corresponding associated pixel in the portion of the image of the scene which has been determined.

The virtual camera rotation matrix may be calculated in accordance with a product of one or more of matrices associated with one or more of the pitch, yaw and roll of the virtual camera.

The virtual camera rotation matrix, V, may be given by:

$V = P_V * Y_V * R_V$ $$P_V \text{ may equal } \begin{bmatrix} 1 & 0 & 0 \\ 0 & \cos\varphi_V & \sin\varphi_V \\ 0 & -\sin\varphi_V & \cos\varphi_V \end{bmatrix}$$

is a pitch rotation matrix, the pitch being defined by an angle $\phi_V$ about the x-axis;

$$Y_V \text{ may equal } \begin{bmatrix} \cos\theta_V & 0 & -\sin\theta_V \\ 0 & 1 & 0 \\ \sin\theta_V & 0 & \cos\theta_V \end{bmatrix}$$

is a yaw rotation matrix, the yaw being defined by an angle $\theta_V$ about the y-axis; and $$R_V \text{ may equal} \begin{bmatrix} \cos\rho_V & \sin\rho_V & 0 \\ -\sin\rho_V & \cos\rho_V & 0 \\ 0 & 0 & 1 \end{bmatrix}$$

is a roll rotation matrix, the roll being defined by an angle $\rho_V$ about the z-axis.

A defined pixel position for the cut out of the captured image may be given by $$s = \begin{bmatrix} s_x \\ s_y \\ s_z \end{bmatrix}$$

wherein $s_x$ and $s_y$ are normalised within a range determined by the ratio of the cut-out with the image of the scene and $s_z$ is determined in accordance with the focal length of the virtual camera $s_x$ may equal x-co-ordinate of the defined pixel position, normalised to be within the range $-n_x\text{-}+n_x$, wherein $$n_x = \frac{\text{width of cut out}}{\text{width of image of the scene}},$$

$s_y$ may equal y-co-ordinate of the defined pixel position, normalised to be within the range $-rn_x\text{-}+rn_x$, wherein $$r = \frac{\text{height of cut out}}{\text{height of image of the scene}},$$

and $s_z$ may equal $-F_V * n_x$, wherein $F_V$=focal length of virtual camera

The circuitry may be further configured to:

apply the virtual camera rotation matrix to the defined pixel position, s, so as to obtain a transformed pixel position, given by $$c = \begin{bmatrix} c_x \\ c_y \\ c_z \end{bmatrix};$$

and process the transformed pixel position, c, so as to map the transformed pixel position onto two-dimensional space, the two-dimensional mapped pixel position given by $$c' = \begin{bmatrix} c'_x \\ c'_y \end{bmatrix}$$

wherein $c_x'$ and $c_y'$ are determined in accordance with focal length of the camera capturing the scene.

$$c'_x \text{ may equal} \frac{c_x}{c_z} * -F_C =$$

x-co-ordinate of the two-dimensional mapped pixel position, normalised to be within the range $-1\text{-}+1$, wherein $F_C$=focal length of the camera capturing the scene, and $$c'_y \text{ may equal} \frac{c_y}{c_z} * -F_C =$$

y-co-ordinate of the two-dimensional mapped pixel position, normalised to be within the range $-a\text{-}+a$, wherein $$a = \frac{\text{height of image of the scene}}{\text{width of image of the scene}};$$

wherein $F_V$ and $F_C$ are defined in units such that they are equal to one for a field of view of 90 degrees.

The focal length of the camera capturing the scene, $F_C$ may be obtained from lens metadata.

The yaw $\theta_V$ and pitch $\phi_V$ of the virtual camera may be controlled by a user operated controller.

The yaw $\theta_V$ and pitch $\phi_V$ of the virtual camera may be controlled by an object tracking algorithm configured to track an object in the captured image of the scene.

The roll $\rho_V$ of the virtual camera may be calculated in accordance with the angle of pitch of the camera capturing the scene about a predetermined pitch axis and the angle of roll of the camera capturing the scene about a predetermined camera roll axis.

The angle of the pitch and/or roll of the camera may be determined from a rig upon which the camera capturing the scene is mounted.

The roll $\rho_V$ of the virtual camera may be calculated using the equation:

$$\rho_V = \sin^{-1}(\sin(\theta_V)*\sin(\phi_V+\phi_{rig}))+\rho_{rig}$$

wherein $\phi_{rig}$ defines an angle of pitch of the camera capturing the scene about a predetermined camera pitch axis and $\rho_{rig}$ defines an angle of roll of the camera capturing the scene about a predetermined camera roll axis, the predetermined first camera pitch and roll axes defining a horizontal plane in the scene.

The device may further comprise:

generating the captured image of the scene as a stitched image captured by a first camera in a first position and a second camera in a second position, the second position being different from the first position.

The cut-out may be corrected for barrel and/or pin cushion distortion in the captured image using lens metadata associated with the camera capturing the image.

The captured image may be captured using a fish-eye lens and may be an image comprising fish-eye distortion. The transformed pixel positions defining the shape and position of the portion of the captured image of the scene may further transformed so that the shape of the portion of the captured image more closely matches a shape of an object in the fish-eye distorted captured image.

According to another aspect, there is provided a computer program product comprising computer readable instructions which, when loaded onto a computer, configure the computer to perform the method according to any one of the above.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
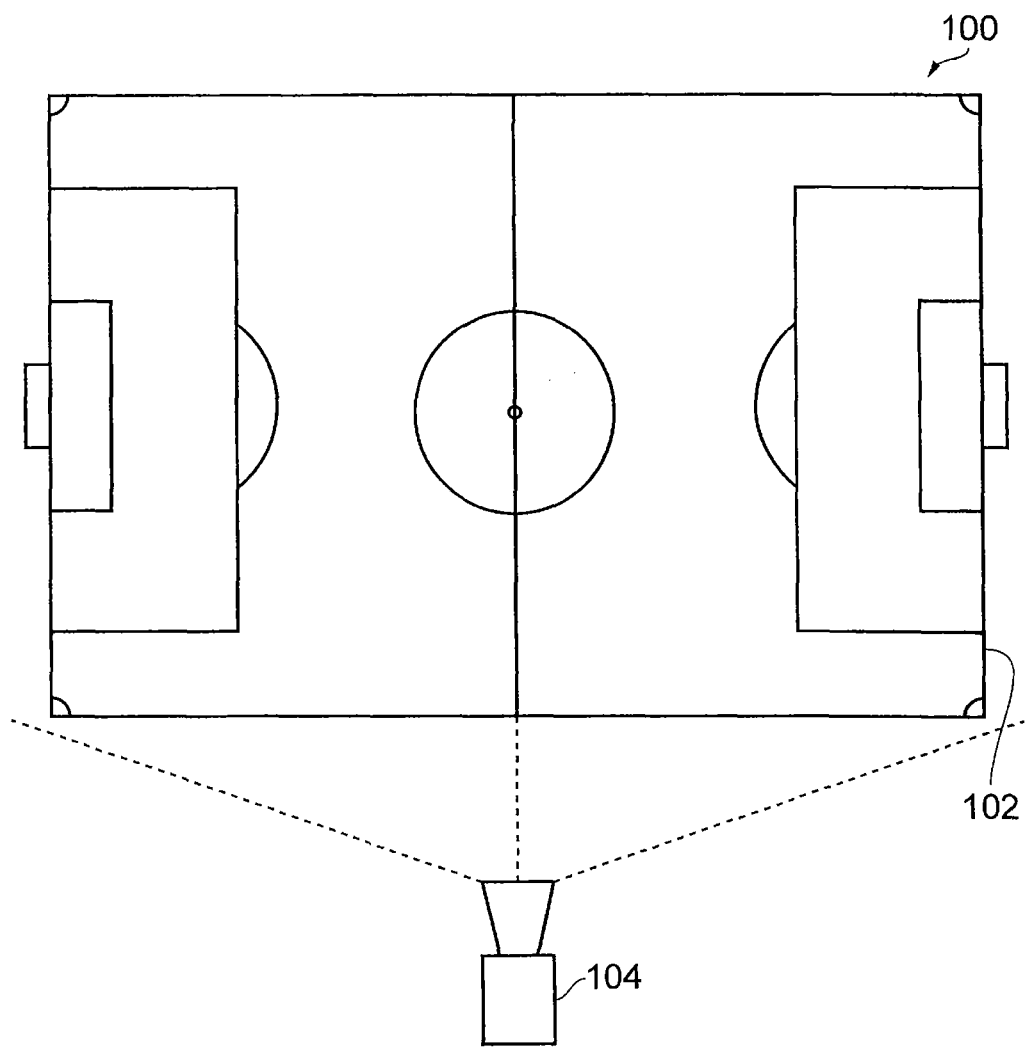
FIG. 1 shows a plan view of a camera capturing the live event.

Referring now to the drawings, wherein like reference numerals designate identical or corresponding parts throughout the several views.

FIG. 1 shows a plan view of a camera capturing the live event 100. This example event is a soccer match. However, any type of live event or real-life scene is envisaged. For example, the real-life scene may be a landscape or building as well as an event such as a concert or sports event. A camera 104 is positioned in the stadium and captures the soccer pitch 102. The camera 104 may be a single camera mounted on tripod. The single camera 104, in embodiments, is a 4K camera. However, any kind of camera with any kind of resolution such as a high definition camera, or an 8K camera is envisaged. Clearly, for such a real-life scene, the camera is equipped with an appropriate lens, which in this case, may be a wide angle lens with an appropriate field of view.

Alternatively, the camera 104 may be an array of two or more cameras capturing the real-life scene. In this alternative case, the images from the array of cameras will be stitched together to form an ultra-high definition image. Again, in the alternative embodiments, each camera in the array may have any resolution and may be, for example, a high definition camera, a 4K camera, an 8K camera, or may have any combination of these resolutions. An exemplary method of stitching images is provided in US 2011/0052093A, filed by Sony Corporation. The entire disclosure of US 2011/0052093A is incorporated herein by reference.

Figure 2:
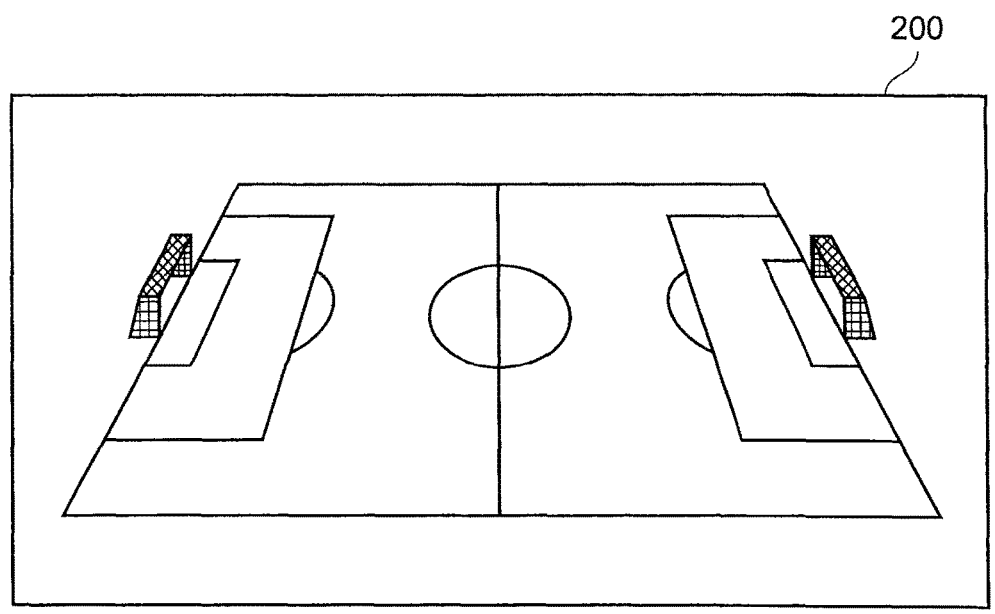
FIG. 2 shows the image 200 captured by the camera 104 of FIG. 1.

FIG. 2 shows the image 200 captured by the camera 104 of FIG. 1. As the camera is located above the soccer pitch 102, the image 200 captured by the camera is a "tele-broadcast" view. In other words, the camera 104 has a slight downward pitch when capturing the real-life scene.

Figure 3:
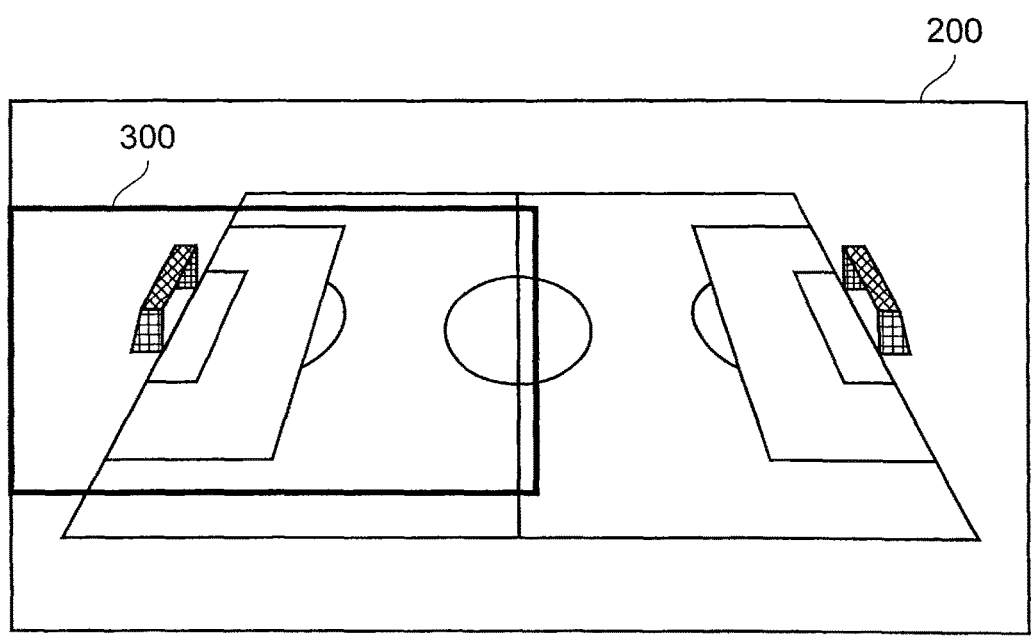
FIG. 3 shows a cut-out 300 of one part of the image captured in FIG. 2.

FIG. 3 shows a cut-out 300 of one part of the image captured in FIG. 2. The cut-out of the image is a segment of the image 200 and replicates a virtual camera pointing at that position within the real-life scene. The position and size of the cut-out 300 of the image 200 may be controlled by a user, using a mouse, or specific roller ball in an editing suite. This replicates the action of a camera operator applying pan, tilt and yaw to camera 104. By adjusting the size of the cut-out 300, the application of zoom is replicated. In other words, the position and size of the cut-out of the image may be moved and altered according to production requirements. The editing suite may be remote to the real-life scene.

Alternatively, an object detection and/or tracking algorithm may determine the position of the cut-out 300 of the image. In this example, the cut-out 300 of the image may follow the ball or one or more particular players or groups of players.

Typically, the cut-out 300 of the image 200 is to be provided to a different display to that of the image 200. For example, if the image 200 is an image formed from stitching two images captured using two cameras each having a 4K resolution, the cut-out 300 may be provided to a high-definition television. Instead, if the image 200 is a single image captured by a single camera having a 4K resolution, the cut-out 300 may be provided to a PS Vita® or any display smaller than a high definition television. Of course, the cut-out 300 from an image 200 captured by a single 4K resolution camera may also be provided to a high definition television. In other words, the cut-out of the image 200 is provided to a display having a lower resolution than the resolution of the captured image 200. The cut-out 300 of the image aims to replicate a camera pointing at and zooming into a particular area of the real life scene.

It is noted that although the cut-out 300 has been described as being displayed on a lower resolution display, this need not necessarily be the case. For example, although the cut-out 300 may cover a smaller area than the area of the image 200, and will thus be formed from a smaller number of pixels, the cut-out 300 may still be displayed on 4K resolution display. In this case, pixel interpolation could be used so that the lower resolution cut-out can still be displayed over the entirety 4K resolution display.

Figure 4:
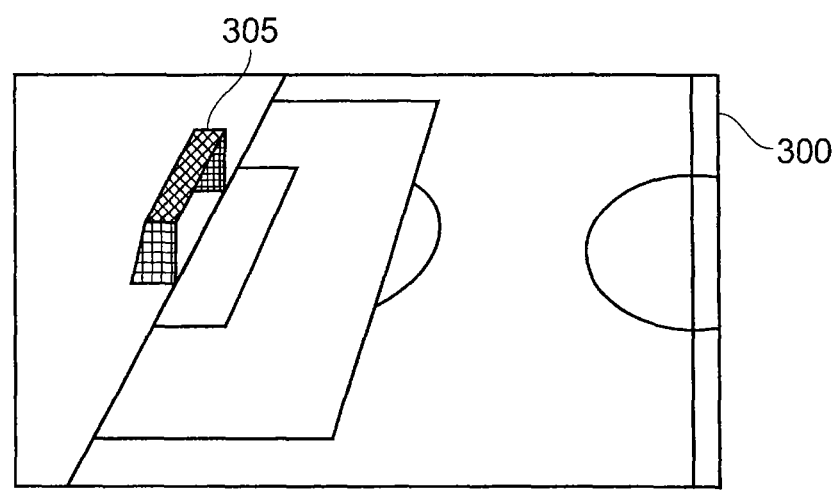
FIG. 4 shows an expanded view of the cut out 300 when displayed.

FIG. 4 shows an expanded view of the cut out 300 when displayed.

This cut-out is generated in a manner similar to that explained in the aforementioned US publication (US 2011/0052093 A), where the cut-out 300 is typically displayed on a handheld device.

From FIG. 4, it may be seen that the perspective of the cut-out image 300 is different to the perspective shown if the camera 104 did in fact capture the segment of the image. In other words, from the perspective of the cut-out image 300, it is apparent that the cut-out of the image does not replicate camera 104 pointing at that position within the real-life scene. In particular, vertical line 305 of the goal post appears slanted in the cut-out 305 of the image 200 which is not correct.

Figure 5:
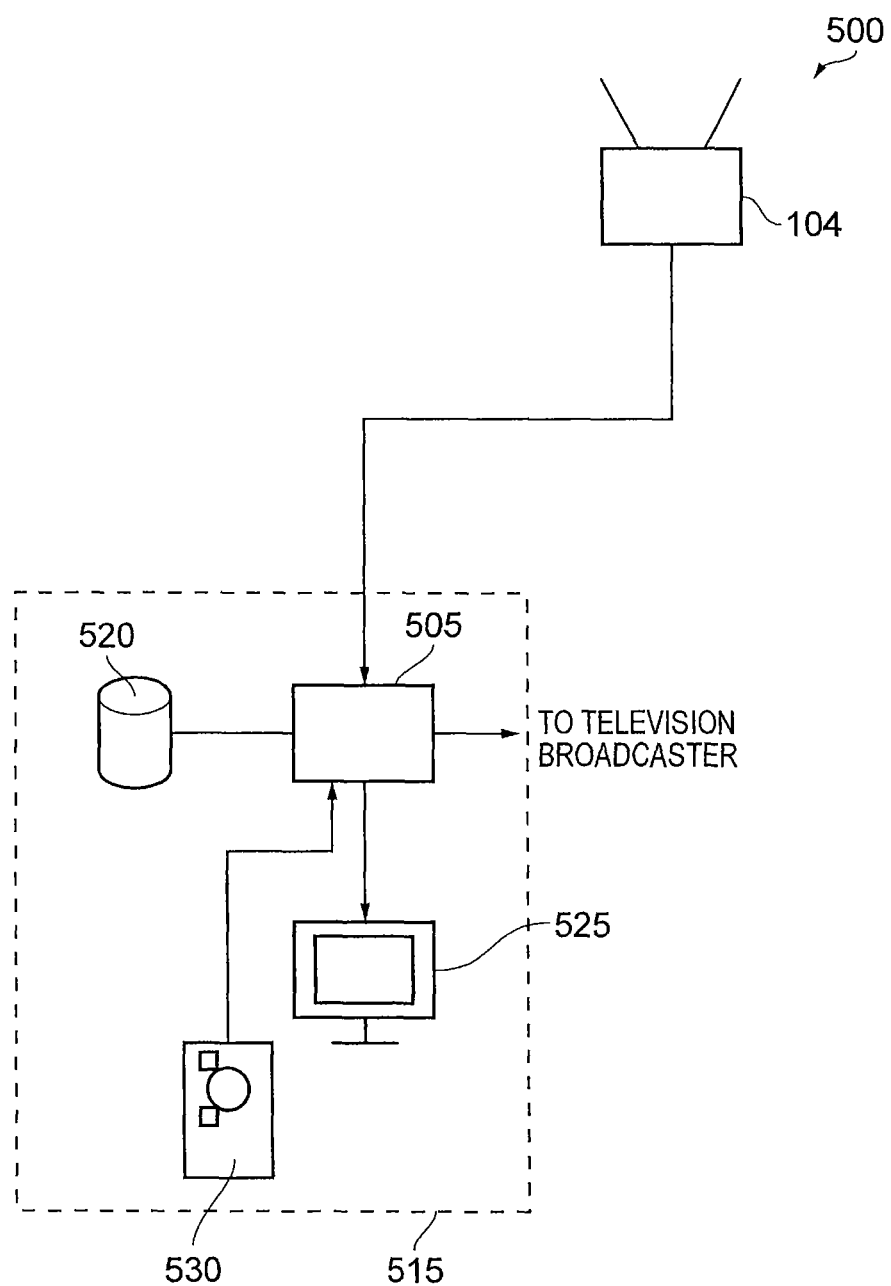
FIG. 5 shows a system according to embodiments of the disclosure.

FIG. 5 shows a system 500 according to embodiments of the disclosure. In the system 500, the camera 104 which captures the real-life scene is connected to a scalable content preparation device 505 which is used to generate an image from the captured image so that it may be used by one or more High Definition televisions, or any kind of personal display device having a screen size smaller than the resolution of the captured image.

The scalable content preparation device 505 generates a segment of the captured image using the mapping technique explained hereinafter. In embodiments, the segment is fed to television broadcasters for broadcast.

Also attached to the scalable content preparation device 505 is a storage medium 520. The storage medium 520 stores the image captured by the camera 104, the cut-out (segment) of the image 200 captured by the camera 104 and computer program instructions which are loaded onto the scalable content preparation device 505 and configure the scalable content preparation device 505 to operate according to the disclosure. The storage medium 520 is a magnetic or optically readable medium or any kind of storage medium which can store data.

Additionally connected to the scalable content preparation device 505 is a monitor 525 and a controller 530. In this case, the monitor 525 displays to the user the position and size of the cut-out of the image (as a wire box overlaid on the image 200) and optionally the actual output cut-out image. The controller is, in embodiments, a mouse, a joystick or a track ball device with zoom-in and zoom-out buttons.

The output of the scalable content preparation device 505 is the cut-out of the image 200 which has been corrected for perspective as will be explained in the following. The corrected cut-out of the image is sent to the television broadcaster.

The scalable content preparation device 505, storage medium 520, monitor 525 and controller 530 are located in an editing suite 515 which may be located near camera 104 or may be located remote to the camera 104 and connected to the camera 104 over a network or via a fibre or co-axial cable (for example).

Figure 6A:
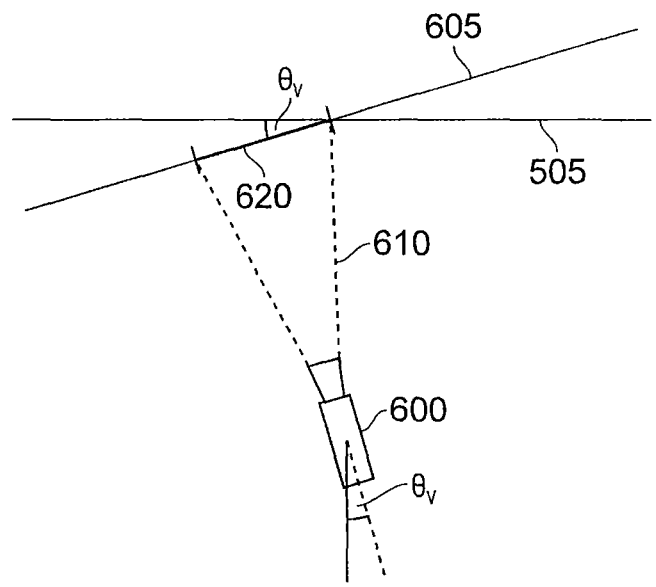
FIGS. 6A to 6C show the positioning of a virtual camera whose image plane forms the cut-out of FIG. 3.
Figure 6B:
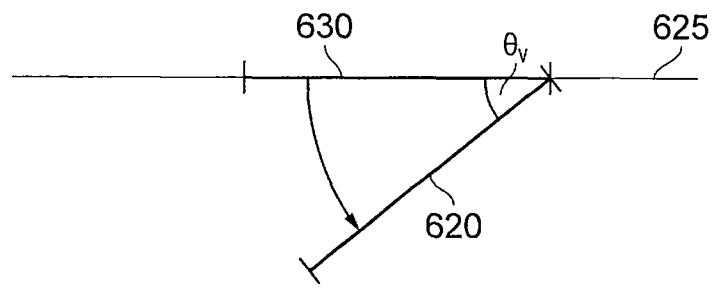
Figure 6C:
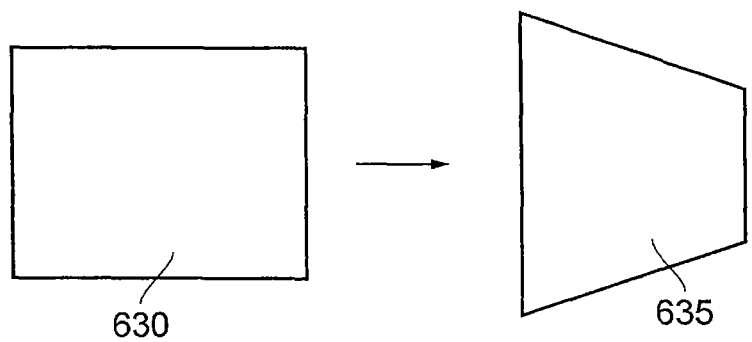

As can be seen in FIGS. 6A-6C, in embodiments, the scalable content preparation device 505 makes use of a virtual camera 600 to obtain a cut-out of the image 200 which has been corrected for perspective. The position of the virtual camera 600 is specified with respect to the position of the real camera 104. Specifically, the position of the virtual camera 600 is defined by a yaw, pitch and roll with respect to the yaw, pitch and roll of the real camera 104. By then considering the focal plane 605 of the virtual camera 600 and its position with respect to the focal plane 505 of the real camera 104, an image cut-out shape which has been corrected for perspective may be obtained. This is explained in detail below.

In FIG. 6A, the virtual camera 600 is positioned with a yaw of $\theta_V$ with respect to the yaw of the real camera 104 which captures the image of the scene, the yaw of the real camera 500 being set to zero. For simplicity, FIG. 6A shows only the yaw of the virtual camera 600. It does not show any pitch or roll applied to the virtual camera 600. However, the skilled person will appreciate that FIG. 6A could equally apply to the virtual camera pitch or roll, and that in reality, any one of the yaw, pitch and/or roll of the virtual camera may change simultaneously as the virtual camera is rotated in three dimensions. As the yaw of the virtual camera 600 differs to the yaw of the real camera 104 by $\theta_V$, the focal plane 605 of the virtual camera 600 is offset from the focal plane 505 of the real camera 104 by an angle of $\theta_V$.

It can be seen in FIG. 6A that the focal plane 605 of the virtual camera 600 includes a portion 620 corresponding to the field of view of the virtual camera 600; the field of view of the virtual camera 600 being indicated by the dashed lines 610. In embodiments, a shape of a cut-out of the image 200 which has been corrected for perspective can be obtained by projecting a relevant portion of the image 200 onto the portion 620 associated with the virtual camera 600. In other words, by performing a rotation transformation on a relevant portion of the image 200 by the angle $\theta_V$, a cut-out of the image 200 which has been corrected for perspective may be obtained.

This is illustrated in FIG. 6B, in which the original image is established as a plane 625 in 3D space. Here, the plane 625 of the original image is viewed directly from above. The virtual camera portion 620, which is a portion of the virtual camera focal plane 605, is also illustrated. In order to obtain a cut-out shape of the image 200 which has been corrected for perspective, a relevant portion 630 of the original image plane 625 is transformed by the angle $\theta_V$ onto the virtual camera portion 620. In embodiments, the relevant portion 630 of the original image plane 625 is rectangular in shape and is equivalent to the rectangular cut-out portion 300 of FIG. 3. As illustrated in FIG. 6C, by transforming the relevant portion 630 by the angle $\theta_V$, the rectangular shape of the relevant portion 630 is transformed to a perspective-corrected shape 635, when considered from the viewpoint of the real camera 104. As will be explained, this perspective-corrected shape 635 is used for generating a cut-out of the image 200 which has been corrected for perspective and which may be displayed on a device such as a high definition television or handheld device.

As already mentioned, FIGS. 6A-6C illustrate a transform resulting from a change in the yaw $\theta_V$ of the virtual camera 600 only. In reality, any one or more of the yaw, pitch and roll of the virtual camera 600 may change simultaneously as the virtual camera is rotated in three dimensions. In embodiments, each of the transforms associated with the yaw, pitch and roll of the virtual camera 600 may be expressed as a respective matrix. Of course, any one of more of the yaw, pitch and roll may be expressed as a respective matrix.

The transform associated with the pitch of the virtual camera 600 may be expressed using the pitch rotation matrix:

$$P_V = \begin{bmatrix} 1 & 0 & 0 \\ 0 & \cos\varphi_V & \sin\varphi_V \\ 0 & -\sin\varphi_V & \cos\varphi_V \end{bmatrix},$$

the pitch being defined by an angle $\varphi_V$ about the x-axis.

The transform associated with the yaw of the virtual camera 600 may be expressed using the yaw rotation matrix:

$$Y_V = \begin{bmatrix} \cos\theta_V & 0 & -\sin\theta_V \\ 0 & 1 & 0 \\ \sin\theta_V & 0 & \cos\theta_V \end{bmatrix},$$

the yaw being defined by an angle $\theta_V$ about the y-axis.

The transform associated with the roll of the virtual camera 600 may be expressed using the roll rotation matrix:

$$R_V = \begin{bmatrix} \cos\rho_V & \sin\rho_V & 0 \\ -\sin\rho_V & \cos\rho_V & 0 \\ 0 & 0 & 1 \end{bmatrix},$$

the roll being defined by an angle $\rho_V$ about the z-axis.

The complete transform may thus be expressed as a virtual camera rotation matrix given by:

$$V = P_V * Y_V * R_V \quad (1)$$

It should be noted that the order in which the matrices $P_V$, $Y_V$ and $R_V$ are written in equation 1 results in a virtual camera rotation matrix V which achieves the most natural-looking perspective-corrected image cut-outs. However, in embodiments, the order in which the matrices $P_V$, $Y_V$ and $R_V$ are multiplied together may also be different to that written in equation 1.

So far in this description, the concept of obtaining a perspective-corrected shape 635 from a relevant portion 630 of the original image has been introduced, according to embodiments. Specifically, it has been explained that by performing a transform on a relevant portion 630 of the original image plane 625 (the transform being determined according to any one or more of the pitch, roll and yaw of the virtual camera), the rectangular shape of the relevant portion 630 is transformed into a perspective-corrected shape 635.

In embodiments, a cut-out of the image 200 which has a perspective-corrected shape 635 may be displayed as a zoomed-in image on a device such as a high definition television or handheld device (that is, on a device which displays images of a lower resolution than that of the image 200). This will now be described.

According to embodiments, the generation of a perspective-corrected cut-out involves starting from a predetermined rectangular plane. The rectangular shape represents the desired shape of the perspective-corrected cut-out when it is displayed on the display device. For example, the rectangular shape is the shape of the screen upon which the perspective-corrected cut-out is displayed. The predetermined rectangular plane is then transformed, according to the yaw, pitch and roll of the virtual camera, so as to obtain a perspective-corrected cut-out shape. This process is illustrated in FIGS. 7A-7C.

Figure 7A:
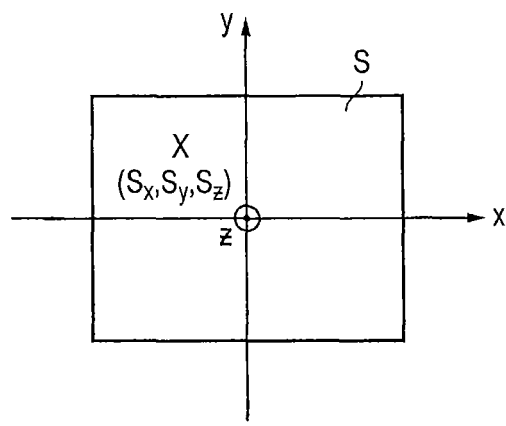
FIGS. 7A-7C shows a rectangular plane to which transforms are applied.
Figure 7B:
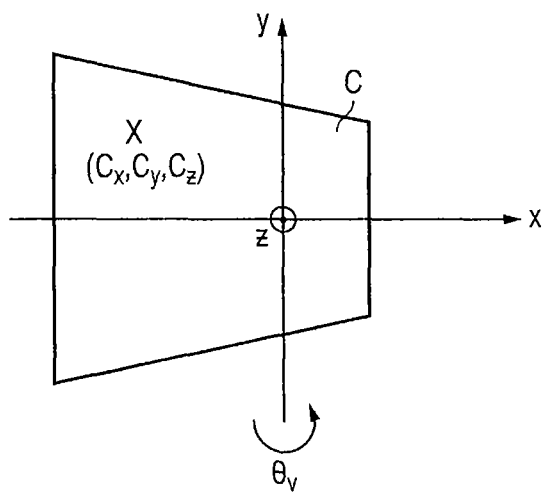
Figure 7C:
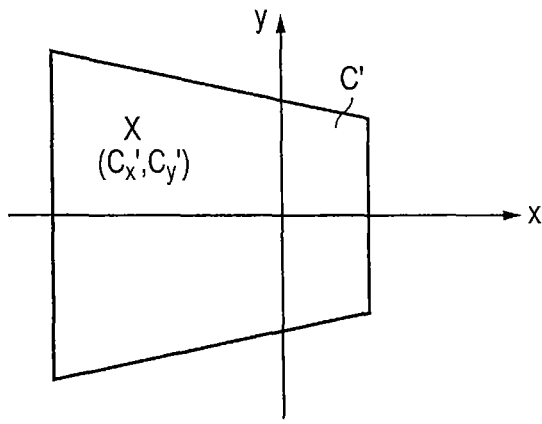

FIG. 7A shows the predetermined rectangular plane as defined in a three-dimensional coordinate system. The predetermined rectangular plane is defined by:

$$s = \begin{bmatrix} s_x \\ s_y \\ s_z \end{bmatrix}$$

where:

$s_x$ is defined to be within the range $-n_x, +n_x$, where $$n_x = \frac{\text{cut-out width}}{\text{image width}};$$

$s_y$ is defined to be within the range $-rn_x, +rn_x$, where r is the screen aspect ratio of the cut-out, given by $$r = \frac{\text{cut-out height}}{\text{cut-out width}};$$

and $s_z = -F_V * n_x =$ focal length of the virtual camera 600, $F_V$, normalised by $n_x$.

Here, the cut-out width/height is the width/height of the cut-out when it is displayed on a lower resolution device and the image width is the width of the image 200. In embodiments, the cut-out width/height and image width may be measured in pixels. As $s_z = -F_V * n_x$ (that is, the negative of the normalised virtual camera focal length), the rectangular plane illustrated in FIG. 7A is effectively positioned at a distance $-F_V * n_x$ into the page. The virtual camera focal length $F_V$ is defined in units such that the focal length is 1 for a field of view of 90 degrees.

The predetermined rectangular plane is then transformed according to the virtual camera rotation matrix V. This results in a transformed plane c, given by:

$$c = \begin{bmatrix} c_x \\ c_y \\ c_z \end{bmatrix}$$

The transformed plane c is obtained by the equation:

$$c = V * s$$

This can be written out in full as:

$$\begin{bmatrix} c_x \\ c_y \\ c_z \end{bmatrix} = \begin{bmatrix} 1 & 0 & 0 \\ 0 & \cos\varphi_V & \sin\varphi_V \\ 0 & -\sin\varphi_V & \cos\varphi_V \end{bmatrix} * \begin{bmatrix} \cos\theta_V & 0 & -\sin\theta_V \\ 0 & 1 & 0 \\ \sin\theta_V & 0 & \cos\theta_V \end{bmatrix} * \begin{bmatrix} \cos\rho_V & \sin\rho_V & 0 \\ -\sin\rho_V & \cos\rho_V & 0 \\ 0 & 0 & 1 \end{bmatrix} * \begin{bmatrix} s_x \\ s_y \\ s_z \end{bmatrix}$$

-continued $$\begin{bmatrix} c_x \\ c_y \\ c_z \end{bmatrix} = \begin{bmatrix} 1 & 0 & 0 \\ 0 & \cos\varphi_V & \sin\varphi_V \\ 0 & -\sin\varphi_V & \cos\varphi_V \end{bmatrix} * \begin{bmatrix} \cos\theta_V\cos\rho_V & \cos\theta_V\sin\rho_V & -\sin\theta_V \\ -\sin\rho_V & \cos\rho_V & 0 \\ \sin\theta_V\cos\rho_V & \sin\theta_V\sin\rho_V & \cos\theta_V \end{bmatrix} * \begin{bmatrix} s_x \\ s_y \\ s_z \end{bmatrix}$$

$$\begin{bmatrix} c_x \\ c_y \\ c_z \end{bmatrix} =$$

$$\begin{bmatrix} \cos\theta_V\cos\rho_V & \cos\theta_V\sin\rho_V & -\sin\theta_V \\ -\cos\varphi_V\sin\rho_V + \sin\varphi_V\sin\theta_V\cos\rho_V & \cos\varphi_V\cos\rho_V + \sin\varphi_V\sin\theta_V\sin\rho_V & \sin\varphi_V\cos\theta_V \\ \sin\varphi_V\sin\rho_V + \cos\varphi_V\sin\theta_V\cos\rho_V & -\sin\varphi_V\cos\rho_V + \cos\varphi_V\sin\theta_V\sin\rho_V & \cos\varphi_V\cos\theta_V \end{bmatrix} * \begin{bmatrix} s_x \\ s_y \\ s_z \end{bmatrix}$$

$c_x = s_x\cos\theta_V\cos\rho_V + s_y\cos\theta_V\sin\rho_V - s_z\sin\theta_V$ $c_y =$
$s_x(-\cos\varphi_V\sin\rho_V + \sin\varphi_V\sin\theta_V\cos\rho_V) + s_y(\cos\varphi_V\cos\rho_V + \sin\varphi_V\sin\theta_V\sin\rho_V) + s_z\sin\varphi_V\cos\theta_V$ $c_z = s_x(\sin\varphi_V\sin\rho_V + \cos\varphi_V\sin\theta_V\cos\rho_V) + s_y(-\sin\varphi_V\cos\rho_V + \cos\varphi_V\sin\theta_V\sin\rho_V) + s_z\cos\varphi_V\cos\theta_V$ The transformed plane c is illustrated in FIG. 7B. For simplicity, it can be seen that the transformed plane c has been obtained from the rectangular plane s by rotating it by an angle $\theta_V$ about the y-axis. This corresponds to a yaw of the virtual camera 600 of $\theta_V$ with respect to the camera 104. In reality, the transformation of the rectangular plane, s, may be the result of a non-zero yaw, pitch and roll of the virtual camera, resulting in a rotation about each of the x, y and z axes.

When considered from the perspective of the camera 104, the transformed plane c appears to have moved to a different position compared to the plane s. This is because the transformed plane c is a result of rotating the plane s about the origin (x=0, y=0, z=0) when the plane s is located at a non-zero z-position, given by $s_z$-$F_V$*$n_x$.

The transformed plane c also appears to have a warped, non-rectangular shape. This is the perspective-corrected shape 635 of the image cut-out. The next step is to transform this perspective-corrected shape 635 into two-dimensions, so that an image-cut with this perspective-corrected shape can be mapped onto the two-dimensional image 200. This is achieved by dividing the coordinates $c_x$ and $c_y$ of the transformed plane c by $c_z$, and then zooming in by the focal length of the camera 104, $-F_c$, so as to obtain the set of two-dimensional coordinates:

$$c' = \begin{bmatrix} c'_x \\ c'_y \end{bmatrix}$$

where:

$$c'_x = -F_c * \frac{s_x\cos\theta_V\cos\rho_V + s_y\cos\theta_V\sin\rho_V - s_z\sin\theta_V}{s_x(\sin\varphi_V\sin\rho_V + \cos\varphi_V\sin\theta_V\cos\rho_V) + s_y(-\sin\varphi_V\cos\rho_V + \cos\varphi_V\sin\theta_V\sin\rho_V) + s_z\cos\varphi_V\cos\theta_V}$$

$$c'_y = -F_c * \frac{s_x(-\cos\varphi_V\sin\rho_V + \sin\varphi_V\sin\theta_V\cos\rho_V) + s_y(\cos\varphi_V\cos\rho_V + \sin\varphi_V\sin\theta_V\sin\rho_V) + s_z\sin\varphi_V\cos\theta_V}{s_x(\sin\varphi_V\sin\rho_V + \cos\varphi_V\sin\theta_V\cos\rho_V) + s_y(-\sin\varphi_V\cos\rho_V + \cos\varphi_V\sin\theta_V\sin\rho_V) + s_z\cos\varphi_V\cos\theta_V}$$

The set of coordinates, c' is illustrated in FIG. 7C. The coordinates c' define the shape 635 of the image cut-out which must be used in order for the perspective of the image cut-out to appear correct when it is displayed as a zoomed-in portion of the image 200 on a lower resolution device such as high definition television. $c'_x$ is output to be within the range −1–+1 and $c'_y$ is output to be within the range −a–+a where a is the aspect ratio of the image 200, given by $$a = \frac{\text{image height}}{\text{image width}}.$$

Again, the focal length of the camera 104, $F_c$, is defined in units such that $F_c$=1 for a field of view of 90 degrees.

In embodiments, the focal length, $F_c$, of the camera 104 can be obtained automatically using metadata from the lens of the camera. This allows the two-dimensional perspective-corrected shape 635 to be generated for any lens, without the user having to manually change the focal length $F_c$ used in calculations by the scalable content preparation device 505 whenever the lens is changed. Alternatively, the focal length $F_c$ could be set by the user.

The yaw and pitch of the virtual camera 600, $\theta_V$, $\phi_V$ are controlled by the controller 530. The roll of the virtual camera, $\rho_V$, can be calculated automatically to correct for any roll in the original image caused by the tilt of the camera rig, or caused by the distortion that naturally occurs when filming with a wide angle lens. This roll is particularly noticeable when taking a cut-out from the original image.

For example, the virtual camera roll may be calculated as follows:

$\rho_V = \sin^{-1}(\sin(\theta_V) * \sin(\phi_V + \phi_{rig}))$ where $\phi_{rig}$ is the angle of tilt (pitch) of the camera rig (e.g. 20 degrees) and $\theta_V$, $\phi_V$ are the yaw and pitch of the virtual camera as defined previously. In this way, the correct roll can be calculated automatically, without any need for additional correction by the user.

The angle of tilt of the rig can be obtained from a sensor in the camera or in the tripod (such as an accelerometer) or by an external device, or it could be manually entered by the user during calibration. If the camera rig is not level and has its own roll, the virtual camera roll must also be corrected for this. Let the camera rig roll=$\rho_{rig}$. Then the virtual camera roll may be calculated as follows:

$$\rho_V = \sin^{-1}(\sin(\theta_V)*\sin(\phi_V+\phi_{rig})) + \rho_{rig}$$

Alternatively, if the rig tilt is unknown, a manual adjustment may be made by adjusting an additional parameter, $\rho_{manual}$. An equation such as equation 2 below may then be used to calculate the virtual camera roll:

$$\rho_V = \sin^{-1}(\sin(\theta_V)*\sin(\phi_V)) + \theta_V * \rho_{manual} + \rho_{rig} \quad (2)$$

$\rho_{manual}$ should be adjusted by the user while the virtual camera is panned to one side, until vertical lines appear correctly on the screen. However, the equation using rig tilt is preferred.

To correct for any picture distortion caused by the lens of the camera 104, lens distortion correction may also be applied to the coordinates c' by the scalable content preparation device 505. The correction may be achieved by adjusting the derived coordinates c', found using the equations described above, by a small amount dependent on the nature of the lens distortion.

For example, a position ($c'_x$, $c'_y$) in the set of coordinates c' may be moved towards or away from the origin. This will help compensate, respectively, for pin cushion or barrel distortion in the original image 200 when an image cut-out with the perspective-corrected shape 635 is used with the original image 200 (as described later). This can be done using the following equations:

$$c''_x = c'_x + b*c'_x*(C-l^2)$$

$$c''_y = c'_y + b*c'_y*(C-l^2)$$

where $$l^2 = (c'_x*c'_x + c'_y*c'_y)*K$$

and C and K are constants. For a typical CCD, C=1.70 and K=1.29 provide good results when the original image 200 is a 16:9 aspect ratio picture.

b is the lens distortion correction parameter. This should be set according to the lens of the camera 104 being used. If the lens is a zoom lens, then the parameter b is likely to be different at different focal lengths.

b=0 for cases when no lens distortion correction is necessary.

b>0 to correct for barrel distortion, while b<0 to correct for pin cushion distortion. In embodiments, we may have −0.1<b<0.1.

The lens distortion characteristics can be passed to the scalable content preparation device 505 as additional metadata from the lens. The lens distortion parameter, b, can then be derived from this. Alternatively, just the lens specification (make and type) can be passed to the scalable content preparation device 505 as metadata and this can then be looked up in a look-up table stored in the storage medium 520 to find the appropriate lens distortion correction parameter, b. For a zoom lens, the current focal length, $F_c$, may also be passed from the lens to allow the lens distortion parameter, b, to be looked up for the given lens at the specified focal length.

When the above lens distortion correction algorithm is applied, the corners of the perspective-corrected shape 635 defined by the coordinates c' should always remain at the same co-ordinates, while the edges will move towards the centre (when correcting for pin cushion distortion) or away from the centre (when correcting for barrel distortion).

We note that the description below refers to the coordinates c', that is, the transformed coordinate plane which has not been corrected for lens distortion. However, it will be appreciated that the description could also apply to the c' coordinate plane when lens distortion correction has been performed.

The result of the process of FIGS. 7A-7C is that for any given pixel co-ordinate, $s_x$, $s_y$, of a desired low resolution, rectangular, zoomed-in image, the position of a corresponding source pixel in the image 200 can be calculated. This will be for a given virtual camera yaw $\theta_V$, pitch $\phi_V$, roll $\rho_V$ and focal length $F_V$, for a given original camera focal length $F_c$, and for a given height and width of each of the image 200 and the desired low resolution, zoomed-in image. This is subject to the coordinates c' being scaled (if necessary) and offset according to the dimensions of the image 200.

The coordinates c' may have to be scaled because they have been calculated with respect to normalised original image dimensions (it is recalled that $c'_x$ is between −1 and +1 and $c'_y$ is between −a and +a). What is actually required is for the coordinates c' to be defined with respect to the actual dimensions of the image 200. This is because the coordinates c' form a perspective-corrected cut-out 300' of the image, as will be explained later. Thus, if the actual image dimensions are not the same as the normlised image dimensions, then scaling is necessary. The scaling of the coordinates c' is such that $c_x$ is between −image width/2 and +image width/2 (the image width being the width of the original image 200) and $c_y$ is between −image height/2 and +image height/2 (the image height being the width of the original image 200).

The coordinates c' must also be offset, by adding image width/2 to $c_x$ and adding image height/2 to $c_y$. This offsetting is necessary because the coordinates c' have been defined so as to include both positive and negative coordinate values (that is, $c_x$ is between −image width/2 and +image width/2 and $c_y$ is between −image height/2 and +image height/2), where as pixels in the image 200 are defined using only positive coordinates (that is, between 0 and image width in the x-direction and 0 and image height in the y-direction). The coordinates c' are offset by adding image width/2 to $c_x'$ and adding image height/2 to $c_y'$. As will be explained in more detail, this allows the coordinates c' to define a cut-out 300' of the image 200.

Figure 8A:
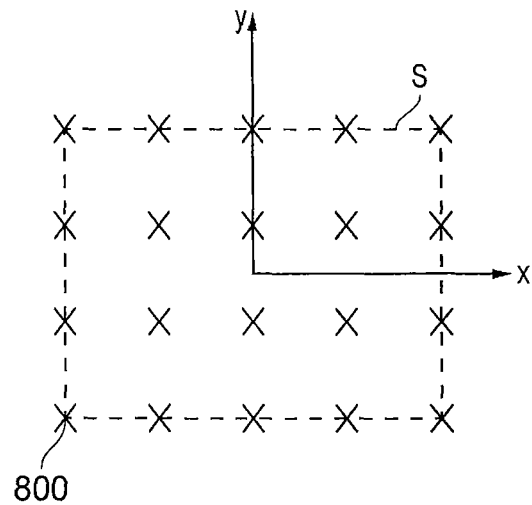
FIGS. 8A-8B show pixel positions located within the rectangular planes of FIG. 7A-7C.
Figure 8B:
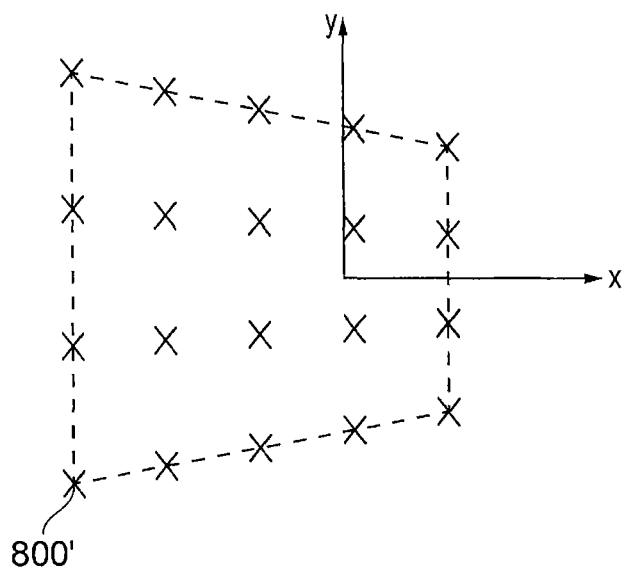

The finding of corresponding source pixels in the image 200 is described with reference to FIGS. 8-16. FIGS. 8A and 8B are reproduced versions of FIGS. 7A and 7C, respectively. The difference, however, is that pixel positions have been marked onto the sets of coordinates s and c'. Specifically, in FIG. 8A, pixels positions 800 on the plane s have been marked. These pixel positions 800 represent the positions of pixels in the rectangular zoomed-in image that is to be displayed by the lower resolution device. In FIG. 8B, transformed pixel positions 800' on the transformed plane c' are shown. The transformed pixel positions 800' are the result of applying the virtual camera rotation matrix V to the plane s (see FIG. 7B) and performing the two-dimensional transformation (see FIG. 7C) previously described on the pixel positions 800.

The set of pixel positions 800' in FIG. 8B form the perspective-corrected shape 635 of the cut-out of the image 200. The perspective-corrected zoomed-in image that is to be displayed on the relevant lower resolution device can now be obtained by mapping the pixel positions 800' to appropriate pixel positions in the image 200. The values of the mapped pixels in the image 200 are then are then used, via the one-to-one relationship between the transformed pixel positions 800' and the original pixel positions 800, to obtain pixel values for the rectangular zoomed in image. This is explained in more detail with reference to FIGS. 9A-9B.

Figure 9A:
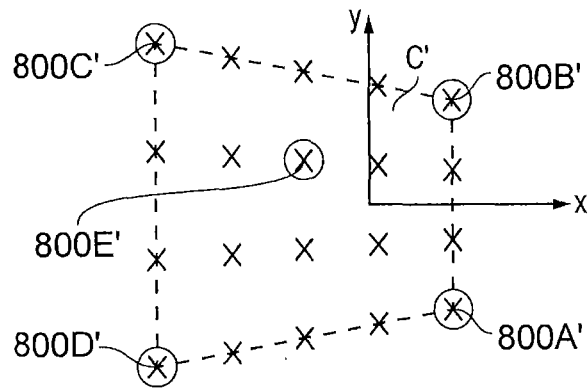
FIGS. 9A-9C shows the transformation of pixel positions in a transformed rectangular plane to corresponding pixel positions in the captured image.

FIG. 9A shows transformed pixel positions 800A', 800B', 800C', 800D' and 800E' of the transformed plane c'. It will be demonstrated how each of these transformed pixel positions will be mapped to a corresponding pixel in the image 200. It is to be understood that in embodiments, all the pixel positions on the transformed plane c' will each be mapped to a corresponding pixel in the image 200, using the method described for pixel positions 800A', 800B', 800C', 800D' and 800E'.

Figure 9B:
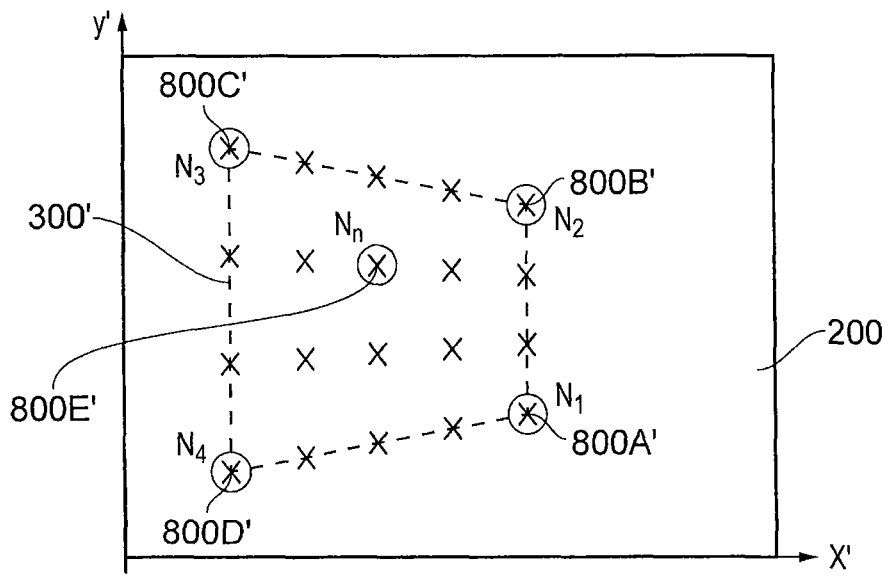

FIG. 9B shows the transformed pixel positions 800A', 800B', 800C', 800D' and 800E' once the transformed plane c' has been scaled (if necessary) and offset according to the dimensions of the original image. This allows the transformed pixel positions 800A', 800B', 800C', 800D' and 800E' to be mapped onto the image 200. More specifically, the transformed pixel positions 800A', 800B', 800C', 800D' and 800E' can each be mapped onto a pixel of the image 200. For each transformed pixel position, the value of the pixel to which it has been mapped can be associated with that transformed pixel position.

In FIG. 9B, it can be seen that transformed pixel position 800A' is associated with a pixel value $N_1$ of the original image 200. Similarly, the transformed pixel position 800B' is associated with a pixel value $N_2$ of the original image 200. This is repeated for the remaining transformed pixel positions, so that transformed pixel positions 800C', 800D' and 800E' are associated with pixel values $N_3$, $N_4$ and $N_n$, respectively. Pixel value $N_n$ is an arbitrary pixel value, used to demonstrate that the pixel matching process can be used for any arbitrary number of transformed pixel positions on the transformed plane c'. In embodiments, the pixels of the image 200 may be colour pixels. Therefore, each pixel value $N_1$, $N_2$, etc. may comprise, for example, a separate value for each of the colours red, green and blue.

Figure 9C:
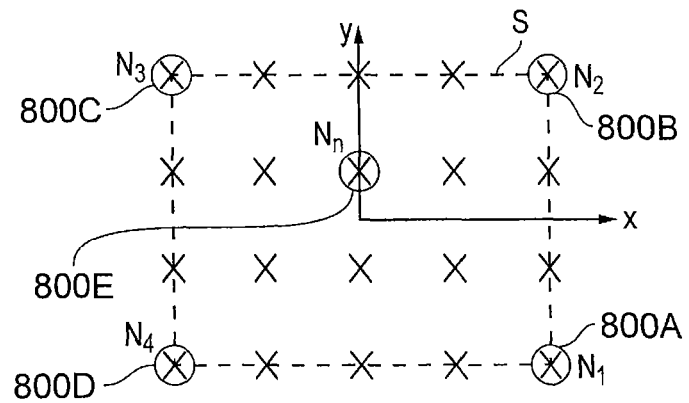

In FIG. 9C, original pixel positions of the plane s, labelled 800A, 800B, 800C, 800D and 800E are shown. These correspond, respectively, to the transformed pixel positions 800A', 800B', 800C', 800D' and 800E'. Because the pixel value $N_1$ has been associated with the transformed pixel position 800A', the pixel $N_1$ can also be associated with the original pixel position 800A. This is because of the one-to-one correspondence between the pixel position 800A and the transformed pixel position 800A'. The same is true for each of the pixel values $N_2$, $N_3$, etc. Specifically, the pixel value $N_2$ can be associated with original pixel position 800B, the pixel value $N_3$ can be associated with original pixel position 800C, etc. In the rectangular, perspective-corrected zoomed-in image, the shape of which is determined by the plane s, the value of pixels in the pixel positions 800A-800E can then be determined using the pixel values $N_1$-$N_n$.

Using this method, each of the original pixel positions 800 can be mapped to a corresponding pixel in the image 200. A rectangular, perspective-corrected zoomed-in image can thus be obtained using the selected pixels of the image 200. It is noted that the selected pixels of the image 200 form a patch of pixels with the perspective-corrected image cut-out shape 635. This is an image cut-out 300' with perspective correction, as shown in FIG. 9B.

Figure 10:
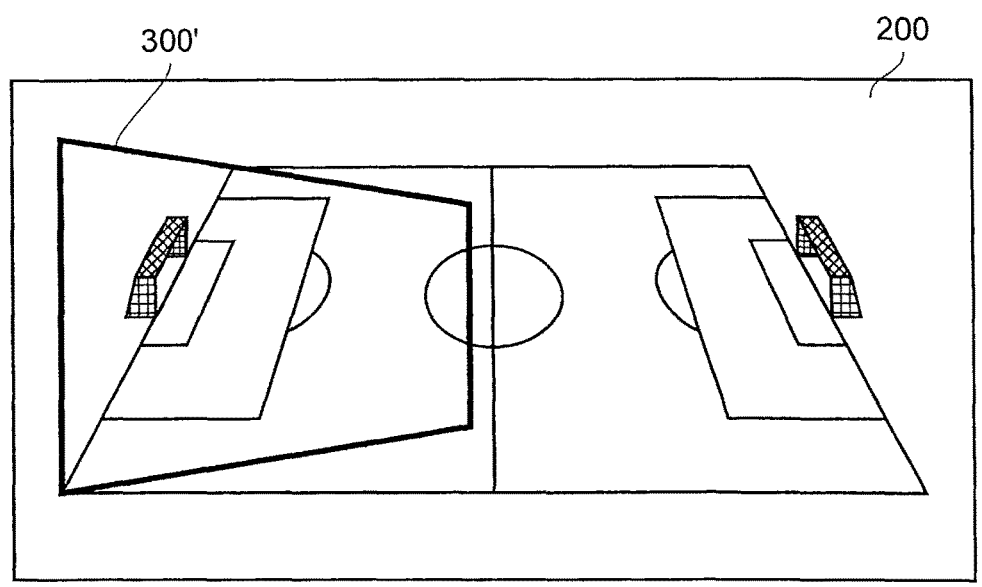
FIG. 10 is similar to FIG. 3, but shows an image cut-out 300' with perspective correction instead of the conventional rectangular image cut-out 300.
Figure 11:
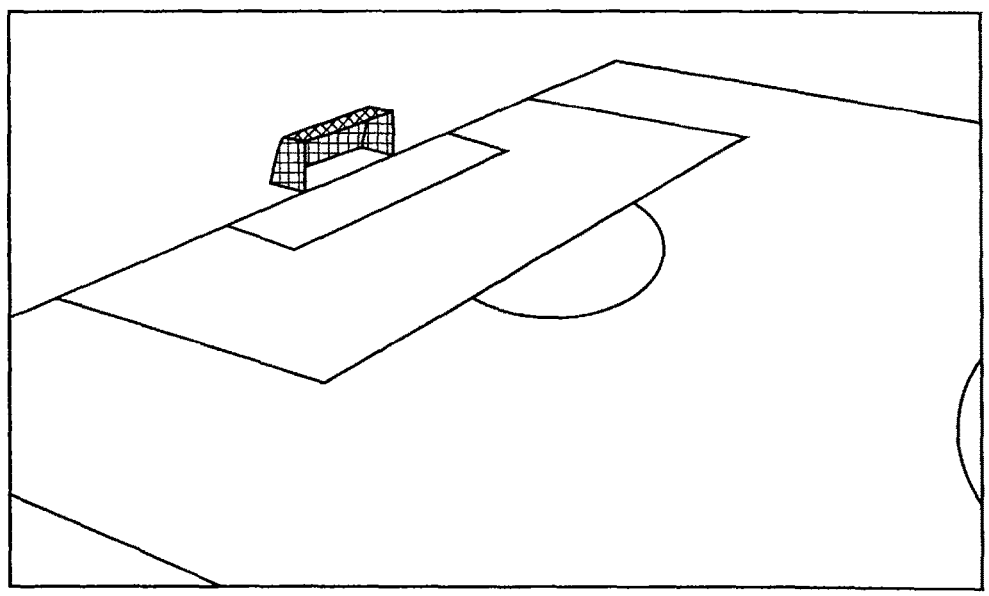
FIG. 11 shows an expanded view of the cut out of FIG. 10 when displayed.

FIG. 10 is similar to FIG. 3, but shows an image cut-out 300' with perspective correction instead of the conventional rectangular image cut-out 300. By using the image cut-out with perspective correction, a zoomed-in, lower resolution portion of the image 200 may be obtained which appears as if it has been captured by the real, physical panning, tilting and/or zooming of the real camera 104. Such a zoomed-in image is generated from the pixels of the cut-out 300', and is illustrated in FIG. 11. The zoomed-in image generated from the cut-out 300' avoids the unnatural-looking perspective that arises from using the non-corrected cut-out 300.

Figure 12:
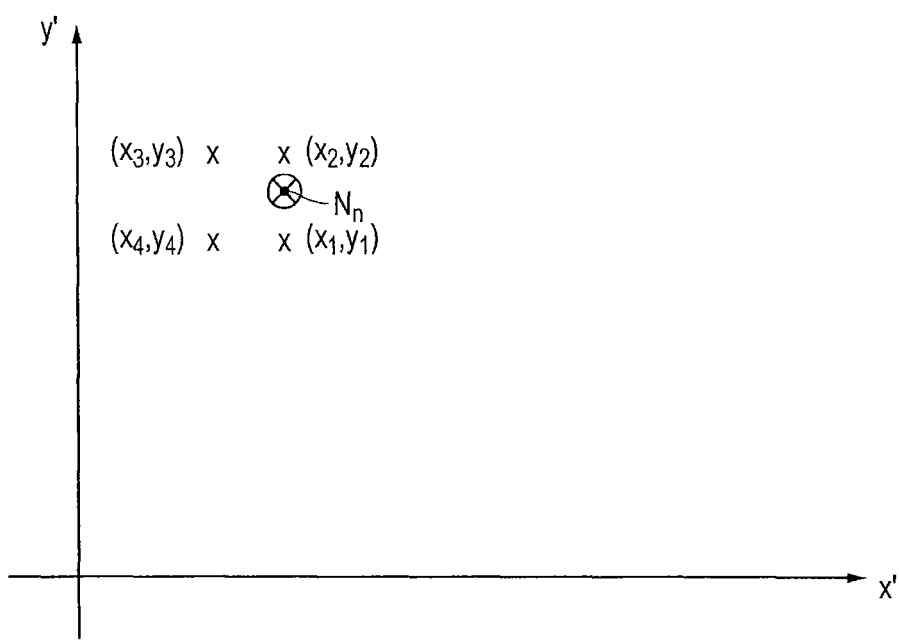
FIG. 12 shows a situation in which the position of the selected pixel in the image, as determined by the position of the virtual camera, does not fall exactly on a pixel position in the image.

FIG. 12 illustrates a situation in which the position of a pixel $N_n$, which is to be mapped to a transformed pixel position 800' in the cut-out 300', does not fall exactly on a pixel position in the image 200. This can occur if, for example, the motion of the virtual camera is perfectly continuous, that is, not granulated so as to take into account the fact that the image 200 is formed from discrete pixels.

In this example, four of the actual pixel positions in the image 200 are illustrated. These actual pixel positions are denoted by $(x_1, y_1)$, $(x_2, y_2)$, $(x_3, y_3)$ and $(x_4, y_4)$. The pixel value $N_n$ is thus determined using at least one of these pixels positions. In embodiments, the value of the closest pixel to that of the selected pixel position could be used. Alternatively, an average or weighted average of the values of at least two of the actual pixels in the image 200 could be used.

Figure 16:
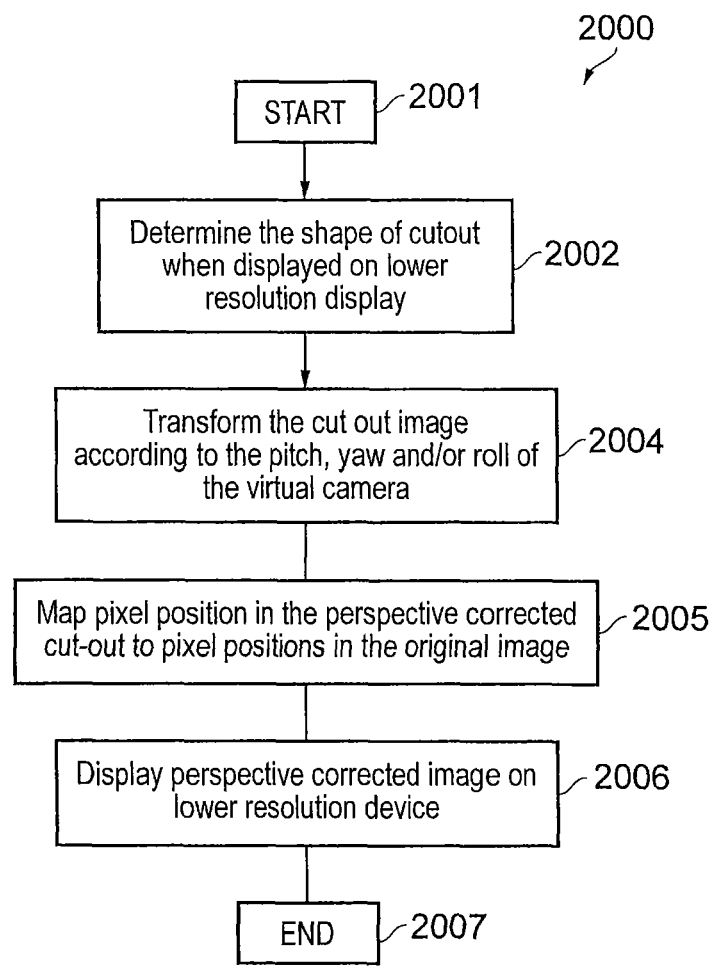
FIG. 16 shows a flow chart explaining embodiments.

A flow chart 2000 describing this process is shown in FIG. 16. The process starts in step 2001. In step 2002, the shape of the cut out when displayed to the user of the lower resolution device is determined. This is typically a rectangular cut-out shaped to fit the screen of the display. In step 2004, the cut-out image is transformed according to the pitch, yaw and roll of the virtual camera. This provides a position and perspective corrected shape for the cut-out. Scaling (if necessary) and offsetting are performed at this stage. In step 2005, the pixel positions in the perspective corrected cut-out are mapped to the pixel positions in the original image. In this way, pixel values for the image to be displayed on the lower resolution device are obtained. In step 2006, the perspective corrected image is displayed on the lower resolution device. Finally, in step 2007, the process ends.

Multiple Cameras

As discussed earlier, the camera 104 may actually be an array of two or more cameras capturing the real-life scene. In this alternative case, the images from the array of cameras may be stitched together to form an ultra-high definition image. In this case, the apparatus 500, as described in FIG. 5, is altered to form system 1700, as illustrated in FIG. 13.

Figure 13:
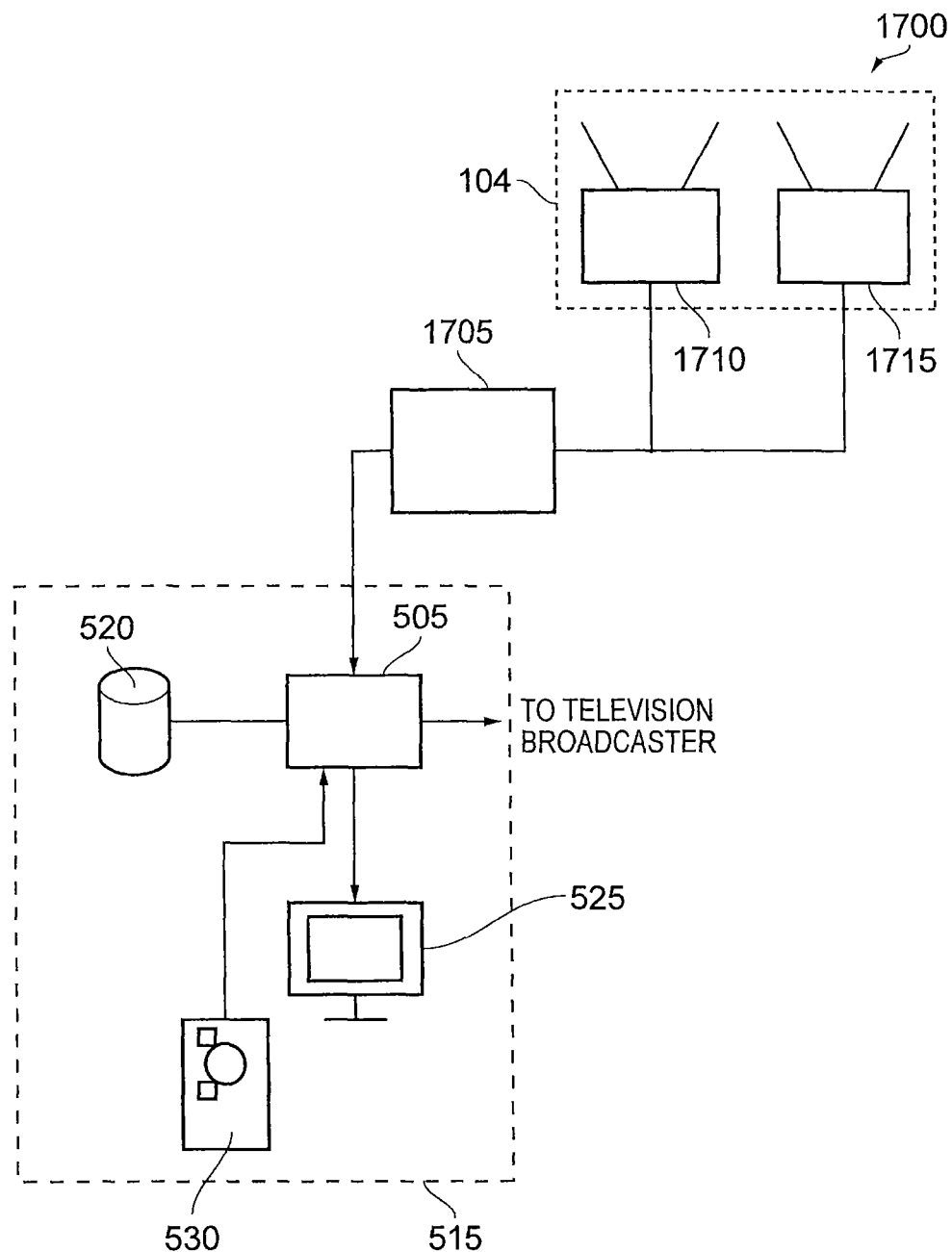
FIG. 13 shows a system according to embodiments of the disclosure when multiple cameras are used to capture images of the scene.

Referring to FIG. 13, the apparatus 1700 comprises a number of extra components to the apparatus 500 (where like reference numerals refer to like features). Specifically, the camera 104 actually comprises two cameras 1710 and 1715. The field of view of each of the two cameras is different with a small area of overlap. Images of the scene are captured from each of the cameras 1710 and 1715. Camera rotation matrices (described in detail below) for each of the cameras 1710 and 1715 are calculated, based on the yaw, pitch and/or roll of each of the cameras relative to a pre-determined reference position (not shown in FIG. 13), via the camera position calculation device 1705. Any suitable method may be used for calculating the camera rotation matrices. An exemplary method is provided in US 2011/0052093A, filed by Sony Corporation. The entire disclosure of US 2011/0052093A is incorporated herein by reference. The camera position calculation device 1705 may be located as a component of the camera 104, as a component of the scalable content preparation device 505 or as a standalone device located in the editing suite 151 or elsewhere.

Advantageously, by using multiple cameras to capture images of the scene from different positions, parts of the scene can effectively be zoomed-in on by the virtual camera whilst still maintaining a reasonably high resolution in the zoomed images. Of course, the number of cameras is not limited to two. Any number of cameras may be used.

Figure 14:
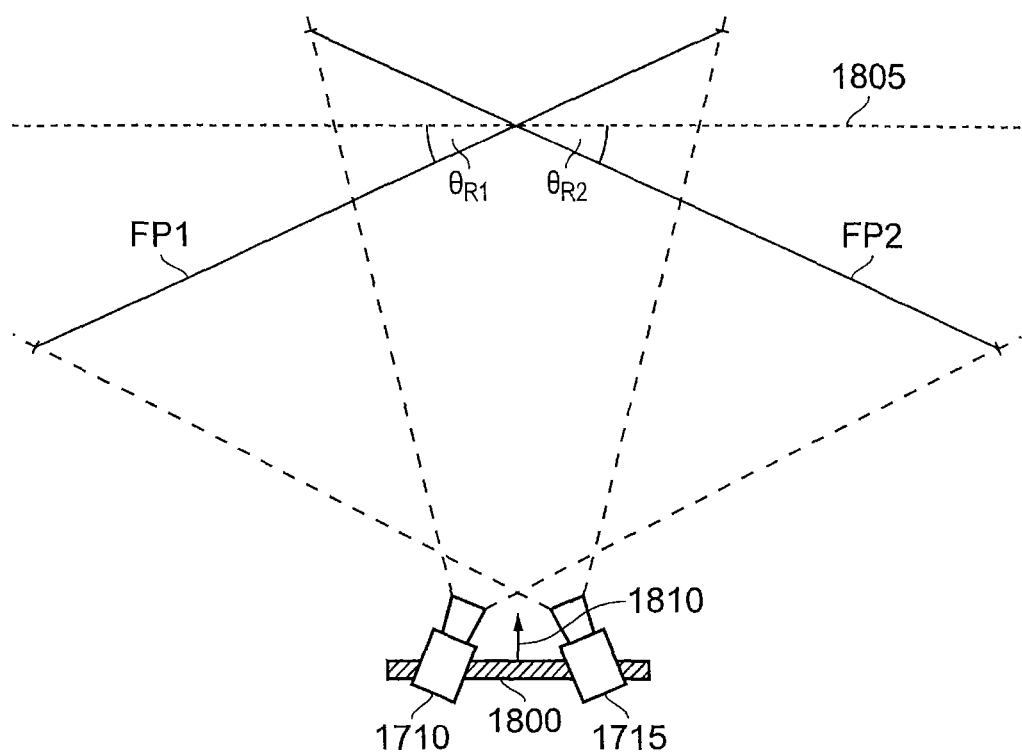
FIG. 14 shows a plan view of a camera array used to capture the image of the scene and the associated camera planes.

FIG. 14 illustrates the focal planes of each of the cameras 1710 and 1715, the cameras being held on a rig 1800. The focal plane of the right camera 1715 is focal plane FP1 and the focal plane of the left camera 1710 is focal plane FP2. The focal planes FP1 and FP2 are angled, respectively, at angles $\theta_{R_1}$ and $\theta_{R_2}$ with respect a reference plane 1805. The orientation of the virtual camera 600 is determined with respect to a reference orientation 1810. When the orientation of the virtual camera 600 is the reference orientation 1800, then the focal plane of the virtual camera is aligned with the reference plane 1805. In embodiments, the focal planes FP1 and FP2 of the cameras may not be orientated with respect to the reference plane 1805 in just one rotational dimension. Rather, each of the cameras 1710 and 1715 may be rotated in three dimensions (by a yaw, pitch and/or roll), resulting in the focal planes FP1 and FP2 being orientated with respect to the reference plane 1805 in three rotational dimensions. Each of the cameras 1710 and 1715 may thus be associated with a camera rotation matrix R. The camera rotation matrix R is similar to the virtual camera rotation matrix V. In embodiments, a general camera rotation matrix R may be expressed as a combination of pitch, yaw and roll:

$$R = R_R * P_R * Y_R$$

where $P_R$ is a pitch rotation matrix given by:

$$P_R = \begin{bmatrix} 1 & 0 & 0 \\ 0 & \cos\varphi_R & -\sin\varphi_R \\ 0 & \sin\varphi_R & \cos\varphi_R \end{bmatrix},$$

pitch being a rotation of an angle of $\varphi_R$ around the x-axis;
$Y_R$ is a yaw rotation matrix given by:

$$Y_R = \begin{bmatrix} \cos\theta_R & 0 & \sin\theta_R \\ 0 & 1 & 0 \\ -\sin\theta_R & 0 & \cos\theta_R \end{bmatrix},$$

yaw being a rotation of an angle of $\theta_R$ around the y-axis; and $R_R$ is a roll rotation matrix given by:

$$R_R = \begin{bmatrix} \cos\rho_R & -\sin\rho_R & 0 \\ \sin\rho_R & \cos\rho_R & 0 \\ 0 & 0 & 1 \end{bmatrix},$$

roll being a rotation of an angle of $\rho_R$ around the z-axis.

Again, it has been found that the order in which $R_R$, $P_R$, and $Y_R$ are multiplied together to obtain R, as given here, results in the most natural-looking image cut-out. However, $R_R$, $P_R$ and $Y_R$ could also be multiplied in a different order.

Because the orientation of each of the cameras 1710 and 1715 is different, each of the cameras 1710 and 1715 is associated with a different camera rotation matrix R. Specifically, camera 1715, which has focal plane FP1, may be associated with a first camera rotation matrix $R_1$ and camera 1710, which has focal plane FP2, may be associated with a second camera rotation matrix $R_2$. Each of the camera rotation matrices $R_1$ and $R_2$ are defined by the yaw, pitch and roll of their respective cameras, and are calculated by the camera position calculation device 1705.

Figure 15:
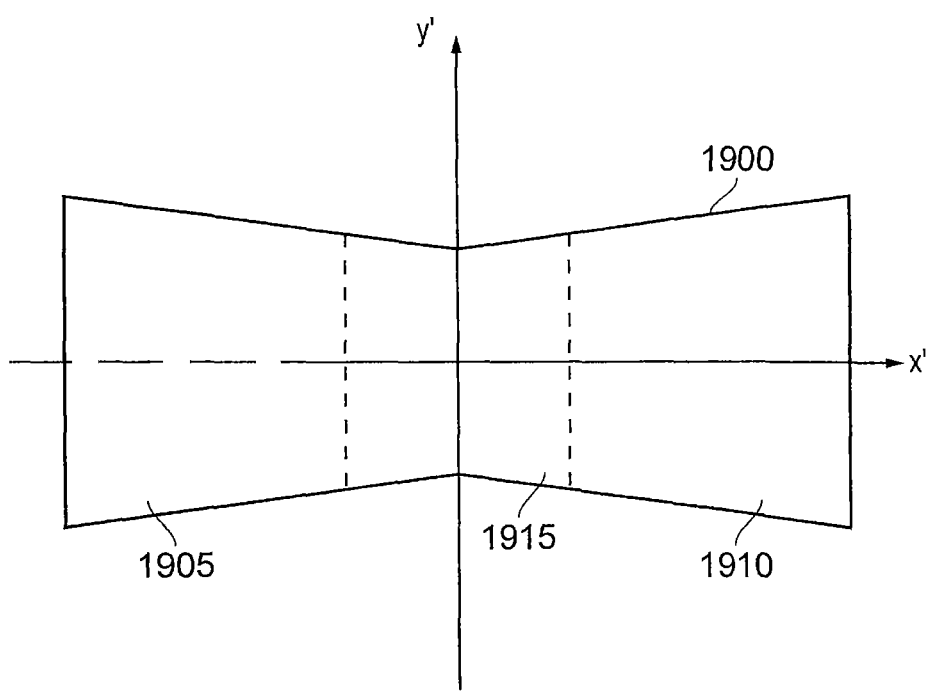
FIG. 15 shows a resultant stitched image using the arrangement of FIG. 14.

Images from each of the cameras 1715 and 1710 are formed, respectively, from objects in the focal planes FP1 and FP2. The images may be stitched together to obtain a two-dimensional stitched image 1900, as illustrated in FIG. 15. In embodiments, the stitched image may comprise a first region 1905, with image data corresponding only to the first focal plane FP1 (that is, from camera 1715), a second region 1910, with image data corresponding only to the second focal plane FP2 (that is, from camera 1705) and a third region 1915, with image data corresponding to both focal planes FP1 and FP2 (that is, from both cameras). The third region 1915 is formed due to the overlap of the focal planes FP1 and FP2.

It is recalled that in the single image embodiments described earlier (that is, where the image 200 is an image captured from a single camera), a perspective-corrected image cut-out shape 635 is obtained by multiplying a predetermined rectangular plane of the size and shape of the desired zoomed-in, lower resolution image by the virtual camera rotation matrix V. This also applies to the multiple, stitched image embodiments. However, an extra term is required in order to compensate for the different orientations of the cameras 1715 and 1710. This term is the relevant camera rotation matrix $R_1$ or $R_2$. Thus, for embodiments with a stitched image, the transformation equation $$c = V * s$$

becomes $$c = R * V * s$$

where R can be $R_1$ or $R_2$. The rest of the processing, such as the transformation of the plane c into two dimensions so as to obtain the coordinates c', remains the same as that described with reference to the single camera embodiment.

Thus, when there are two cameras, for each of the pixel positions 800 in the predetermined rectangular plane s, there are two possible transformations. Specifically, there is one transformation with $R_1$ and one transformation with $R_2$. In order to obtain the required perspective corrected shape and position of the cut-out 300', the transformation of each of the pixel positions in the plane s is performed for both $R_1$ and $R_2$. Once the two-dimensional transformation has been achieved so as to obtain the c' coordinates, the resulting value of the c' coordinates reveals whether pixels from the left-most image (from camera 1715, formed by objects in the focal plane FP1) or the right-most image (from camera 1710, formed by objects in the focal plane FP2) are to be used as source pixels.

To consider this in more detail, it is recalled that for the single camera case, the two-dimensional transformed coordinate $c_x'$ will be between −1 and 1 and the two-dimensional transformed coordinate $c_y'$ will be between −a and a, where $$a = \frac{\text{image height}}{\text{image width}}$$

(the image height and image width being the height and width of the original image 200, respectively). For the multiple camera case, these limits should also apply to the transformed coordinates ($c_x'$, $c_y'$) (with the limit a being determined from the height and width of an image from one of the cameras 1710 and 1715) for at least one of $R_1$ and $R_2$. For a given original pixel position 800, there are three possible cases following the transformation using each of $R_1$ and $R_2$.

In the first case, the obtained coordinates ($c_x'$, $c_y'$) for the transformed pixel position 800' fall within the above defined limits when $R_1$ is used, but not when $R_2$ is used. This means that the correct transformed pixel position 800' to use is the one for $R_1$. It also means that a pixel value to be associated with the original pixel position 800 (to form the final zoomed-in image) will be taken from the left-hand image (that is, from the image defined by the focal plane FP1 of the camera 1715).

In the second case, the obtained coordinates ($c_x'$, $c_y'$) for the transformed pixel position 800' fall within the above defined limits when $R_2$ is used, but not when $R_1$ is used. This means that the correct transformed pixel position 800' to use is the one for $R_2$. It also means that a pixel value to be associated with the original pixel position 800 (to form the final zoomed-in image) will be taken from the right-hand image (that is, from the image defined by the focal plane FP2 of the camera 1710).

In the third case, the obtained coordinates ($c_x'$, $c_y'$) for the transformed pixel position 800' fall within the above defined limits for both $R_1$ and $R_2$. This means that either of the transformed pixel positions 800' may be used and that a source pixel value may be taken from either of the left-hand or right-hand image. In embodiments, the scalable content preparation device 505 may be set to select one of the transformed pixel positions 800' in this case. For example, the scalable content preparation device 505 may be set to always choose the transformed pixel position 800' determined for $R_1$ (although, it would equally be possible for the transformed pixel position 800' determined for $R_2$ to be chosen instead). In this case, a pixel value to be associated with the original pixel position 800 (to form the final zoomed-in image) will be taken from the left-hand image. Alternatively, both calculated transformed pixel positions 800' can be used, and a pixel value to be associated with the original pixel position 800 (to form the final zoomed-in image) can be obtained as a weighted combination of the mapped pixel values in the left-hand and right-hand original images.

Thus, by transforming each of the pixel positions 800 using, separately, the camera rotation matrices $R_1$ and $R_2$, and by then choosing one of the resulting transformed pixel positions using the predetermined c' coordinate limits, a set of final transformed pixel positions 800' is obtained. Also, for each transformed pixel position 800', a pixel value to be associated with the relevant original pixel position 800 may be found, for the formation of the final, perspective-corrected, zoomed-in image.

In a similar way to the single camera case previously described with reference to FIGS. 9A-9C, the transformed pixel positions 800' form the shape of a perspective-corrected cut-out 300'. By scaling and offsetting the set of transformed pixel positions 800' as appropriate, pixel values from at least one of the original images captured by the cameras 1710 and 1715 may be associated with each of the original pixel positions 800, thus allowing a perspective-corrected zoomed-in image to be obtained.

Figure 17:
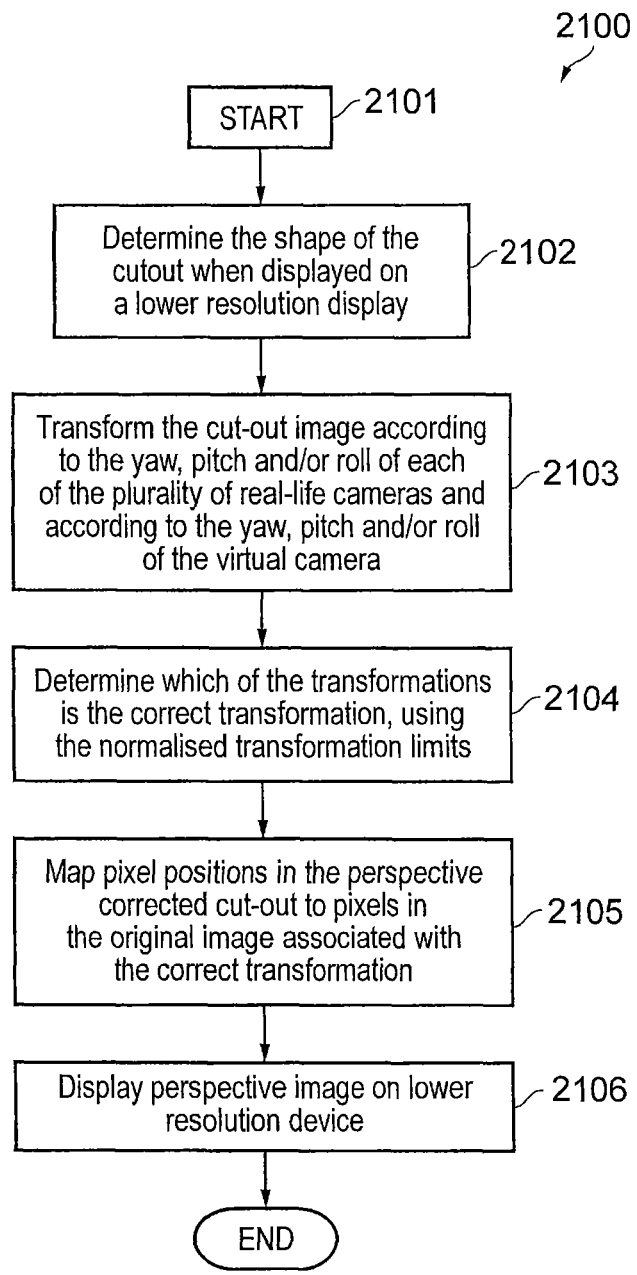
FIG. 17 shows a flow chart explaining embodiments multiple captured images of the scene.

A flow chart 2100 describing this process is shown in FIG. 17. The process starts in step 2101. In step 2102, the shape of the cut out when displayed to the user of the lower resolution device is determined. This is typically a rectangular cut-out shaped to fit the screen of the display. In step 2103, the cut-out image is transformed according to the pitch, yaw and/or roll of each of the real life cameras and according to the yaw, pitch and/or roll of the virtual camera. This provides a plurality of possible transformations for the cut-out image. In step 2104, a correct transformation of the cut-out image is determined. A correct transformation is one where the pixel positions of the transformed cut-out fall within the predetermined, normalised x and y limits. There may be more than one correct transformation for a given pixel position. This provides a position and a perspective corrected shape for the cut-out with respect to the original image(s) associated with the correct transformation(s). Scaling (if necessary) and offsetting are performed at this stage. In step 2105, the pixel positions in the perspective corrected cut-out are mapped to the pixel positions in the original image(s). In this way, pixel values for the image to be displayed on the lower resolution device are obtained. In step 2106, the perspective corrected image is displayed on the lower resolution device. Finally, in step 2008, the process ends.

Virtual Camera Limiting Algorithm

For both the single camera and multiple camera cases, the lower resolution perspective-corrected zoomed-in image is obtained from pixel values of an original captured image 200 using the perspective-corrected cut-out 300'. Specifically, the values of pixels which fall within the area of the scaled and offset perspective-corrected cut-out 300' are used to generate the pixels of the perspective-corrected-zoomed in image.

In order to ensure that there are no blank pixels in the resulting zoomed-in image (that is, pixels for which no data can be obtained), a limiting process may be applied to the three-dimensional rotation of the virtual camera 600 so as to ensure that the entirety of the scaled and offset perspective-corrected cut-out 300' remains within the area of the original image. In other words, no part of the cut-out 300' must be allowed to move outside of the area of the original image, since this will result in certain areas of the zoomed-in image being left blank (because there is no corresponding pixel data from the original image).

In embodiments, the following limiting algorithm may be used to ensure that the cut-out 300' remains within the area of the original captured image.

It is recalled that equation 3 below defines the first step in calculating a transformed pixel position 800' from an original pixel position 800. Specifically, this equation describes the rotational transformation of the predetermined rectangular plane s to obtain the plane c (see FIGS. 7A-7B):

$$c = R * V * s \quad (3)$$

For the multiple camera case, the camera rotation matrix R is expressed as a combination of pitch, yaw and roll of each camera:

$$R = R_R * P_R * Y_R$$

For the single camera case, no rotation of the physical camera 104 is required, and hence R is set equal to the identity matrix (I).

The virtual camera rotation matrix V is also expressed as a combination of pitch, yaw and roll (albeit in a different order):

$$V = P_V * Y_V * R_V$$

So, the equation for obtaining the transformed coordinate plane c $$c = R * V * s$$

can be written as:

$$C = R_R * P_R * Y_R * P_V * Y_V * R_V * s$$

The minimum and maximum yaw and pitch of the virtual camera 600 depend on the current level of zoom as well as the current position of the virtual camera.

Yaw Limits Algorithm

The minimum yaw for the virtual camera can be considered as the yaw for which the left corners of the final zoomed-in image (represented by the plane s) meet the left edge original image 200. This can be obtained by finding the yaw $\theta_V$ for a given set of transformed coordinates c' and original coordinates s.

All other parameters such as the current pitch, $\phi_V$, roll, $\rho_V$ and focal length, $F_V$, are fixed at their current values for the calculation.

First, combining the terms either side of the virtual camera yaw rotation matrix, $Y_V$, gives:

$$c = A * Y_V * B * s$$

where $$A = R_R * P_R * Y_R * P_V$$

and $$B = R_V$$

Let the vector p be the partial result, $$p = B * s$$

So, $$c = A * Y_V * p$$

Writing this out in full gives:

$$\begin{bmatrix} c_x \\ c_y \\ c_z \end{bmatrix} = \begin{bmatrix} A_{11} & A_{12} & A_{13} \\ A_{21} & A_{22} & A_{23} \\ A_{31} & A_{32} & A_{33} \end{bmatrix} * \begin{bmatrix} \cos\theta_V & 0 & -\sin\theta_V \\ 0 & 1 & 0 \\ \sin\theta_V & 0 & \cos\theta_V \end{bmatrix} * \begin{bmatrix} p_x \\ p_y \\ p_z \end{bmatrix}$$

$$\begin{bmatrix} c_x \\ c_y \\ c_z \end{bmatrix} = \begin{bmatrix} A_{11} & A_{12} & A_{13} \\ A_{21} & A_{22} & A_{23} \\ A_{31} & A_{32} & A_{33} \end{bmatrix} * \begin{bmatrix} p_x\cos\theta_V - p_z\sin\theta_V \\ p_y \\ p_x\sin\theta_V + p_z\cos\theta_V \end{bmatrix}$$

$$\begin{bmatrix} c_x \\ c_y \\ c_y \end{bmatrix} = \begin{bmatrix} A_{11}p_x\cos\theta_V - A_{11}p_z\sin\theta_V + A_{12}p_y + A_{13}p_x\sin\theta_V + A_{13}p_z\cos\theta_V \\ A_{21}p_x\cos\theta_y - A_{21}p_z\sin\theta_V + A_{22}p_y + A_{23}p_x\sin\theta_V + A_{23}p_z\cos\theta_V \\ A_{31}p_x\cos\theta_V - A_{31}p_z\sin\theta_V + A_{32}p_y + A_{33}p_x\sin\theta_V + A_{33}p_z\cos\theta_V \end{bmatrix}$$

We are interested in the leftmost corners of the perspective-corrected cut-out 300' coinciding with the left hand edge of the original image. This will occur when the leftmost value of the two-dimensional transformed plane c', as defined in the x-direction, is given by $c_x' = -1$. We recall that $c_x'$ can be found by dividing $c_x$ by $c_z$ and then zooming in by the focal length ($F_c$) of the camera 104, –.

$$c_x' = -F_c * \frac{c_x}{c_z}$$

$$c_x' = -F_c * \frac{A_{11}p_x\cos\theta_V - A_{11}p_z\sin\theta_V + A_{12}p_y + A_{13}p_x\sin\theta_V + A_{13}p_z\cos\theta_V}{A_{31}p_x\cos\theta_V - A_{31}p_z\sin\theta_V + A_{32}p_y + A_{33}p_x\sin\theta_V + A_{33}p_z\cos\theta_V}$$

$$c_x'A_{31}p_x\cos\theta_V - c_x'A_{31}p_z\sin\theta_V + c_x'A_{32}p_y + c_x'A_{33}p_x\sin\theta_V +$$
$$c_x'A_{33}p_z\cos\theta_V = -F_cA_{11}p_x\cos\theta_V + F_cA_{11}p_z\sin\theta_V -$$
$$F_cA_{12}p_y - F_cA_{13}p_x\sin\theta_V - F_cA_{13}p_z\cos\theta_V$$

$$(c_x'A_{31}p_x + c_x'A_{33}p_z + F_cA_{11}p_x + F_cA_{11}p_x + F_cA_{13}p_z)\cos\theta_V +$$
$$(-c_x'A_{31}p_z + c_x'A_{33}p_x - F_cA_{11}p_z + F_cA_{13}p_x)\sin\theta_V =$$
$$-c_x'A_{32}p_y - F_cA_{12}p_y$$

This is of the form:

$$a\cos\theta + b\sin\theta = c$$

This can be solved by using the trigonometric identity:

$$\cos(\theta - \alpha) = \cos\theta\cos\alpha + \sin\theta\sin\alpha$$

First, introduce, R:

$$\therefore R\cos(\theta - \alpha) = R\cos\theta\cos\alpha + R\sin\theta\sin\alpha$$

$$\therefore R\cos(\theta - \alpha) = (R\cos\alpha)\cos\theta + (R\sin\alpha)\sin\theta$$

Let $a = R\cos\alpha$; $b\cos\alpha = R\sin\alpha$
Then:

$$R\cos(\theta - \alpha) = a\cos\theta + b\sin\theta$$

Now, $a^2 + b^2 = R^2\cos^2\alpha + R^2\sin^2\alpha = R^2(\cos^2\alpha + \sin^2\alpha) = R^2$ $$\therefore R = \sqrt{a^2 + b^2}$$

Also, $$\frac{R\sin\alpha}{R\cos\alpha} = \frac{b}{a},$$

$$\therefore \tan\alpha = \frac{b}{a}$$

$$\therefore \alpha = \tan^{-1}\frac{b}{a}$$

So, $$\sqrt{a^2 + b^2}\cos(\theta - \alpha) = a\cos\theta + b\sin\theta$$

where $$\alpha = \tan^{-1}\frac{b}{a}$$

Comparing with $a\cos\theta + b\sin\theta = c$ we see that:

$$c = \sqrt{a^2 + b^2}\cos(\theta - \alpha)$$

Rearranging to find:

$$\cos(\theta - \alpha) = \frac{c}{\sqrt{a^2 + b^2}} \quad (4)$$

$$\theta - \alpha = \cos^{-1}\frac{c}{\sqrt{a^2 + b^2}}$$

$$\theta = \cos^{-1}\frac{c}{\sqrt{a^2 + b^2}} + \alpha$$

$$\theta = \cos^{-1}\frac{c}{\sqrt{a^2 + b^2}} + \tan^{-1}\frac{b}{a}$$

This can now be used to solve for $\theta_Y$, by substituting in the values for a, b and c:

$$a = c'_x A_{31} p_x + c_x' A_{33} p_z + F_c A_{11} p_x + F_c A_{13} p_z$$

$$b = -c_x' A_{31} p_z + c_x' A_{33} p_x - F_c A_{11} p_z + F_c A_{13} p_x$$

$$c = -c_x' A_{32} p_y - F_c A_{12} p_y$$

Matrix A can be calculated from the known camera rotation matrix R (if applicable) and the current virtual camera pitch rotation matrix:

$$A = R_R * P_R * Y_R * P_V$$

Partial result, p, can be calculated using:

$$p = B * s$$

where $B = R_V$ is the current virtual camera roll rotation matrix, and s is the appropriate coordinate of the rectangular plane s which represents the size and shape of the desired zoomed-in image. In other words, s is an appropriate screen coordinate of the zoomed-in image (we recall that the original pixel positions 800, which define the actual pixel coordinates of the zoomed-in image, are defined on the plane s). Typically, two screen co-ordinates are tested for each limit. To find the minimum yaw, we test the top left screen co-ordinate and the bottom left screen co-ordinate.

For top left screen co-ordinate, $$\text{set } s = \begin{bmatrix} -n_x \\ rn_x \\ -F_v \end{bmatrix}.$$

For bottom left screen co-ordinate, $$\text{set } s = \begin{bmatrix} -n_x \\ -rn_x \\ -F_v \end{bmatrix}.$$

Here, $F_v$ is the focal length of the virtual camera 600, and the earlier definitions of $n_x$ and r (which describe the size of the zoomed-in image with respect to the size of the original image) are used. As already mentioned, we are interested in the leftmost corners of the perspective-corrected cut-out 300' coinciding with the left hand edge of the original image. This will occur when the leftmost value of the two-dimensional transformed plane c', as defined in the x-direction, is given by $c_x' = -1$. This value of $c_x'$ is thus used together with each of the top left and bottom left screen coordinates in equation (4) so as to obtain two values of $\theta_Y$. The first is the yaw value for which the top left screen co-ordinate coincides with the left hand edge of the original image, while the second is yaw value for which the bottom left screen co-ordinate coincides with the left hand edge of the original image. The most restrictive of these two values (i.e. the least negative) should be used as the current value of the minimum yaw.

The process is repeated to find the maximum yaw, this time using the top right screen co-ordinate and the bottom right screen co-ordinate.

For top right screen co-ordinate, $$\text{set } s = \begin{bmatrix} n_x \\ rn_x \\ -F_v \end{bmatrix}.$$

For bottom right screen co-ordinate, $$\text{set } s = \begin{bmatrix} n_x \\ -rn_x \\ -F_v \end{bmatrix}.$$

These co-ordinates are tested against the right hand edge of the original image, so this time, $c_x' = 1$ should be used.

This will again result in two values of $\theta_Y$, being calculated. The first is the yaw value for which the top right screen co-ordinate coincides with the right hand edge of the original image, while the second is the yaw value for which the bottom right screen co-ordinate coincides with the right hand edge of the original image. The most restrictive of these two values (i.e. the least positive) should be used as the current value of the maximum yaw.

In embodiments, these limits are applied in a damping algorithm (as will be described below) to limit the current x value of the virtual camera position.

It should be noted that if the user zooms in or out, the minimum and maximum yaw calculated will be affected (since $F_v$ will have changed) and the new minimum and maximum yaw will immediately be applied as described in the damping algorithm. This also occurs if the user changes the pitch of the virtual camera 600, or if the roll of the virtual camera changes. The pitch and/or roll of the virtual camera may change due to a change in pitch or rig pitch or indeed if any of the parameters describing the camera 104 are changed. In this way, the virtual camera 600 is constantly kept within the bounds of the original image.

Thus, the limiting technique described obtains the leftmost and right-most possible values of the two-dimensional transformed set of coordinates c' (that is, $c_x' = \pm 1$), the set of coordinates c' defining the perspective-corrected cut-out shape 635. It also obtains coordinates for the corners of the plane s, the plane s defining the size and shape of the final, zoomed-in image. The limiting technique then uses this, with all other real camera 104 and virtual camera 600 parameters fixed, to find the minimum and maximum yaw of the virtual camera 600.

This technique has advantages over other techniques that may use a different algorithm to test whether the corners of the cut-out are outside the bounds of the original image and apply a control mechanism to correct the virtual camera position. A control mechanism is likely to have some latency, so the cut-out cannot be guaranteed to always be within the bounds of the original image at all times. This results in the zoomed-in image having blank pixels until these are subsequently corrected, which is undesirable. Also, such control mechanisms can become unstable as they can tend to over-correct the error.

In order to calculate the minimum and maximum yaw with multiple images, the minimum yaw will be calculated with respect to the left hand image (that is, the image defined by objects in the first focal plane FP1) and the maximum yaw will be calculated with respect to the right hand image (that is, the image defined by objects in the second focal plane FP2). For the left hand image, $R_1$ would be used in the above equations. For the right hand image, $R_2$ would be used in the above equations.

Pitch Limits Algorithm

A similar method is used to limit the pitch of the virtual camera. In this case, the terms either side of the virtual camera pitch rotation matrix, $P_V$, are combined to give:

$$c = A * P_V * B * s$$

where $$A = R_R * P_R * Y_R$$

and $$B = Y_V * R_V$$

Again, let the vector p be the partial result, $$p = B * s$$

So, $$c = A * P_V * p$$

Writing this out in full gives:

$$\begin{bmatrix} c_x \\ c_y \\ c_z \end{bmatrix} = \begin{bmatrix} A_{11} & A_{12} & A_{13} \\ A_{21} & A_{22} & A_{23} \\ A_{31} & A_{32} & A_{33} \end{bmatrix} * \begin{bmatrix} 1 & 0 & 0 \\ 0 & \cos\varphi_V & \sin\varphi_V \\ 0 & -\sin\varphi_V & \cos\varphi_V \end{bmatrix} * \begin{bmatrix} p_x \\ p_y \\ p_z \end{bmatrix}$$

This can be expanded using the same approach as for the yaw, except this time we are interested in the y position, $c_y'$. The same trigonometric identity can then again be used to derive the solution for determining the pitch, $\phi_V$.

Typically, two screen co-ordinates would be tested for each limit. To find the minimum pitch for the virtual camera, the top left screen co-ordinate and the top right screen co-ordinate is tested.

For top left screen co-ordinate, $$\text{set } s = \begin{bmatrix} -n_x \\ rn_x \\ -F_v \end{bmatrix}.$$

For top right screen co-ordinate, $$\text{set } s = \begin{bmatrix} n_x \\ rn_x \\ -F_v \end{bmatrix}.$$

These co-ordinates are tested against the top edge of the original image 200, so $c_y' = a$ should be used (where a is the ratio of the original image height to the original image width, as defined earlier). This results in two values of $\phi_V$ being calculated. The first is the pitch value for which the top left screen co-ordinate coincides with the top edge of the original image, while the second value is the pitch value for which the top right screen co-ordinate coincides with the top edge of the original image. The most restrictive of these two values (that is, the least negative) should be used as the current value of the minimum pitch.

The process is repeated to find the maximum pitch, this time using the bottom left screen co-ordinate and the bottom right screen co-ordinate.

For bottom left screen co-ordinate, $$\text{set } s = \begin{bmatrix} -n_x \\ -rn_x \\ -F_v \end{bmatrix}$$

For bottom right screen co-ordinate, $$\text{set } s = \begin{bmatrix} n_x \\ -rn_x \\ -F_v \end{bmatrix}$$

These co-ordinates are tested against the bottom edge of the original image, so $c_y' = -a$ should be used. This will again result in two values of $\phi_V$ being calculated. The first is the pitch value for which the bottom left screen co-ordinate coincides with the bottom edge of the original image, while the second is the pitch value for which the bottom right screen co-ordinate coincides with the bottom edge of the original image. The most restrictive of these two values (i.e. the least positive) should be used as the current value of the maximum pitch.

In embodiments, these limits are applied in a damping algorithm (as will be described below) to limit the current y value of the virtual camera position.

In embodiments, to obtain the minimum and maximum pitch when there are multiple cameras, the above algorithm may be used to test against the left hand image (that is, the image defined by objects in the first focal plane FP1) when the virtual camera is pointing left, $\theta_V < 0$, and the right hand image (that is, the image defined by objects in the second focal plane FP2) when the virtual camera is pointing right, $\theta_V > 0$. For the left hand image, $R_1$ would be used in the above equations. For the right hand image, $R_2$ would be used in the above equations.

Alternatively, the pitch limits can be calculated against both cameras at all times (taking the most restrictive values by testing for both $R_1$ and $R_2$), or the pitch limits may gradually change from being calculated against the left image (using $R_1$) to being calculated against the right image (using $R_2$) as the yaw changes from negative to positive.

Adjusting the Limits for Lens Distortion Correction

As previously described, additional barrel or pin cushion distortion correction may be performed on the transformed coordinates c' which define the shape 635 of the perspective-corrected cut-out 300'. Because such additional correction will slightly change the shape 635 of the perspective-corrected cut-out 300', the limits on the motion of the virtual camera 600 will need to be slightly adjusted to take this into account. Specifically, the yaw and pitch limits for the virtual camera 600 need to be reduced when barrel distortion correction is performed on the transformed coordinates c', since this will result in the transformed coordinates c' moving further from the centre of the original image 200 (and thus the edges of the cut-out 300' may move off the original image 200 at the conventional limits). The limits for the yaw and/or pitch may be reduced by using the previously defined lens distortion correction equations to modify the values of $c'_x$ or $c'_y$ that are used to calculate the yaw and pitch limits. The lens distortion correction equations are repeated here:

$$c''_x = c'_x + b * c'_x * (C - l^2)$$

$$c''_y = c'_y + b * c'_y * (C - l^2)$$

where $$l^2 = (c'_x * c'_x + c'_y * c'_y) * K$$

C and K are constants and b is the lens distortion correction parameter, as described previously. The yaw and pitch limits should only be modified for cases where b>0 (barrel distortion), as this is when the edges of the barrel distortion-corrected original image will move towards the centre and the virtual camera limits should thus be made more restrictive. It is noted that the movement of the edges of the original image 200 towards the centre to correct for barrel distortion is equivalent to the edges of the cut-out 300' moving away from the centre to correct for barrel distortion. In embodiments, the edges of the cut-out 300' are moved away from the centre through the use of the distortion correction equations on the transformed coordinates c'. Advantageously, this means that barrel distortion correction is only performed on the part of the original image 200 required for cut-out, reducing the amount of processing required.

However, because of this equivalence, the calculation of the new limits, following barrel distortion correction of the shape of the cut-out 300', can be performed by considering movement of the edges of the original image 200. The calculation of the new limits, using this approach, is explained below.

Yaw Limits

When adjusting the value of $c'_x$ (−1 or +1) to test for the yaw limits, $c'_y = 0$ will give the worst case adjustment. This is because $c'_y = 0$ is the midpoint position along the left or right hand edge of the original image, which will move the greatest distance towards the centre following correction for barrel distortion. Therefore, $c'_y = 0$ should be used in the lens distortion correction equations above to find the worst-case adjusted value of $c'_x$. The adjusted value, $c''_x$, can then be used in the yaw limits equations in place of $c'_x$. That is, instead of using the limits $c_x = \pm 1$ in the yaw limits equations, the adjusted values determined for each of $\pm 1$ using the distortion correction equations can be used instead.

Pitch Limits

Likewise, when adjusting the value of $c'_y$ (−a or +a) to test for the pitch limits, $c'_x = 0$ will give the worst case adjustment. This is because $c'_x = 0$ is the midpoint position along the top or bottom edge of the original image, which will move the greatest distance towards the centre following correction for barrel distortion. Therefore, $c'_x = 0$ should be used in the lens distortion equations to find the worst-case adjusted value of $c'_y$. The adjusted value, $c''_y$, can then be used in the pitch limits equations in place of $c'_y$. That is, instead of using the limits $c_x = \pm a$ in the pitch limits equations, the adjusted values determined for each of $\pm a$ using the distortion correction equations can be used instead. Note that when b is negative, meaning that pin cushion distortion correction is being applied, the edges of the original image 200 will have moved away from the centre. In this case, one might think that the yaw and pitch limits could be made less restrictive. However, only the edges of the original image will have moved while the corners will have stayed in the same place. This means that the worst case, in terms of restrictions of the yaw and pitch, is at the corners. Therefore, to ensure that the cut-out 300' is always within the bounds of the original image at the corners, no changes should actually be made to make the limits less restrictive.

Figure 18:
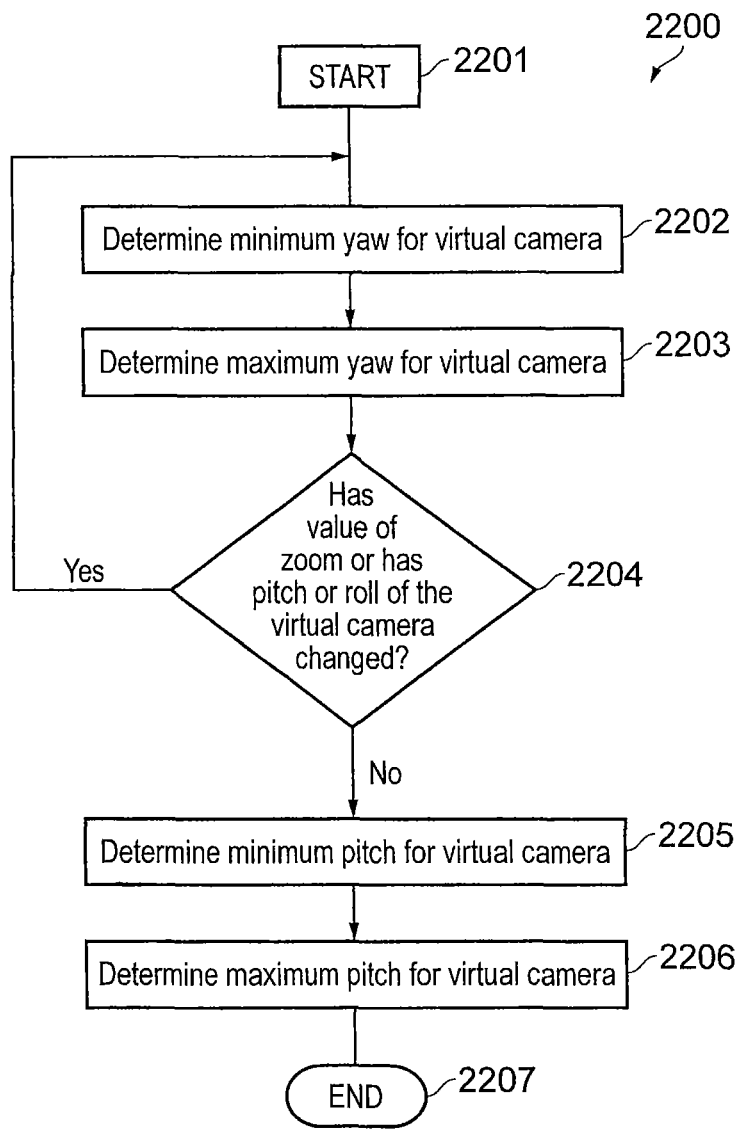
FIG. 18 shows a flow chart explaining the limitation of movement associated with the virtual camera.

Referring to FIG. 18, a flow chart 2200 showing the virtual camera limiting algorithm is provided. This process starts at 2201. The minimum yaw for the virtual camera is determined in 2202. The maximum yaw for the virtual camera is determined in 2203. In step 2204, it is decided whether the value of zoom or pitch or roll of the virtual camera has changed. If the answer is yes, the process returns to step 2202. Alternatively, if the answer is no, the minimum pitch for the virtual camera is determined in 2205. The maximum pitch for the virtual camera is determined in 2206 and the process ends in 2207.

Damping and Sensitivity Algorithm

The aim of the damping algorithm is to create a realistic virtual camera movement with natural-feeling inertia from the movements of the controller 530. The controller 530 is used for altering the yaw, pitch and zoom of the virtual camera 600, and could comprise, for example, a mouse, a joystick or trackball device.

The controller movement is received as a regularly updated x, y and z position. A position could be defined as a difference from the previous position (this is how a mouse sends its co-ordinates) or as an absolute position. In embodiments, the z-position may be changed multiplicatively, so that zooming in by a certain factor (for example, by factor 2, so that the zoom is doubled) takes the same amount of time, no matter what the zoom level (thus, it takes the user the same amount of time to zoom in from ×2 to ×4 as it does from ×4 to ×8).

The controller position is given by:

$$j = \begin{bmatrix} j_x \\ j_y \\ j_z \end{bmatrix}$$

The x and y positions will ultimately be interpreted as the virtual camera yaw and pitch. As already mentioned, the z position will be interpreted as the virtual camera zoom.

The target yaw, pitch and zoom of the virtual camera 600 (which, combined, may be referred to as the target virtual camera position) are calculated using a scaled version of the controller position. The scaling depends on the required positional sensitivity and zoom sensitivity of the controller.

$$\text{Target virtual camera position} = t = \begin{bmatrix} t_x \\ t_y \\ t_z \end{bmatrix} = \begin{bmatrix} PS * j_x \\ PS * j_y \\ ZS * j_z \end{bmatrix}$$

Here, PS=positional sensitivity and ZS=zoom sensitivity. These can be set according to user preference. Usually, the positional sensitivity for x and y would be the same, but a different value of PS could be used for each. If, for example, the user wanted it to be easy to change the yaw of the camera but difficult to change its pitch, a lower value of PS would be used for $j_y$ than for $j_x$.

Additionally, PS may be scaled according to the current zoom. For example, a scaled version of PS, PS', could be obtained as:

$$PS' = PS/j_z$$

or $PS' = PS/\sqrt{j_z}$

This ensures that the position of the virtual camera will change more slowly when it is zoomed in. The target position for the virtual camera is then limited:

$$\text{Target virtual camera position} = t' = \begin{bmatrix} t'_x \\ t'_y \\ t'_z \end{bmatrix} = f_{limit}(t)$$

The function $f_{limit}$ is a function which uses the limiting algorithm described earlier. It prevents the position of the virtual camera 600 from exceeding predetermined limits of the yaw and/or pitch which would result in certain pixels of the final, zoomed-in image being left blank (due to corresponding areas of the perspective-corrected cut-out 300' moving off the edge of the original image 200).

The current position of the virtual camera 600, that is, the position that is currently used for the generation of the zoomed-in image, will be gradually modified to move towards the target position at a rate determined by a damping coefficient. Each new, temporary, virtual camera position v' that occurs during this gradual modification is obtained from the previous position v using the equation:

$$\text{New virtual camera position} = v' = \begin{bmatrix} v'_x \\ v'_y \\ v'_z \end{bmatrix} = \begin{bmatrix} v_x + (t'_x - v_x)*d \\ v_y + (t'_y - v_y)*d \\ v_z + (t'_z - v_z)*d \end{bmatrix}$$

The damping coefficient, d, is typically 0.1, but can be adjusted to any value, for example, according to user preference. Also, the damping coefficient may be changed in dependence on the new virtual camera position. For example, the damping coefficient may be increased towards the edge of the original image 200 to avoid over-run of the virtual camera off of the original image 200.

Finally, the current virtual camera position v' is also limited, to again ensure that the entirety of the perspective-corrective cut-out 300', from which the final, zoomed-in image is formed, remains within the bounds of the original image 200.

$$\text{Limited new virtual camera position} = v'' = \begin{bmatrix} v''_x \\ v''_y \\ v''_z \end{bmatrix} = f_{limit}(v')$$

The additional limiting is necessary as the interim positions between the starting virtual camera position and the target virtual camera position will not previously have been tested against the limits. This means that the virtual camera 600 appears to pan from one position to another, with all the interim images produced during this pan being within the limits of the original image 200 (and thus no blank pixels are generated). This results in the pan of the virtual camera 600 appearing more like the pan of a real camera across a scene.

The x, y and z positions are interpreted as virtual camera yaw, pitch and zoom using a scaling constant:

$$\text{Yaw}, \theta_v = v'_x * S_x$$

$$\text{Pitch}, \phi_v = v'_y * S_y$$

$$\text{Zoom}, F_v = v'_z * S_z$$

Here, $S_x$, $S_y$, and $S_z$ are scaling constants.

Alternatively, because the controller motion is supposed to represent the angular movement of a camera in an arc, yaw and pitch may be obtained by an inverse tangent operation:

$$\text{Yaw}, \theta_v = \tan^{-1}(v'_x * S_x)$$

$$\text{Pitch}, \phi_v = \tan^{-1}(v'_y * S_y)$$

This gives the camera a more accurate constant speed of movement across the original (or stitched) camera picture.
Correction for Fish-Eye Lenses In embodiments, the camera 104 or cameras 1710, 1715 may comprise a fish-eye lens which is used in capturing the original image. A fish-eye lens is a wide angle lens with a very short focal length. For example, a fish-eye lens may have a focal length of around 10 mm. The use of such a lens is advantageous because it gives the camera 104 or cameras 1710, 1715 a very wide field of view. Thus, for example, if a single camera 104 is used, then the use of a fish-eye lens can ensure that the entire soccer pitch 102 can be captured in the image 200.

The problem with a fish-eye lens, however, is that the capture image 200 can appear distorted. This distortion is a well known characteristic of fish-eye lenses, and gives the captured image 200 a convex, non-rectilinear appearance. Fish-eye distortion is well known in the art, so will not be described in more detail here. Although fish-eye distortion is often used in images deliberately as an artistic effect, in embodiments, it is undesirable, because it leads to a distorted and unnatural-looking image cut out 300'.

Figure 19A:
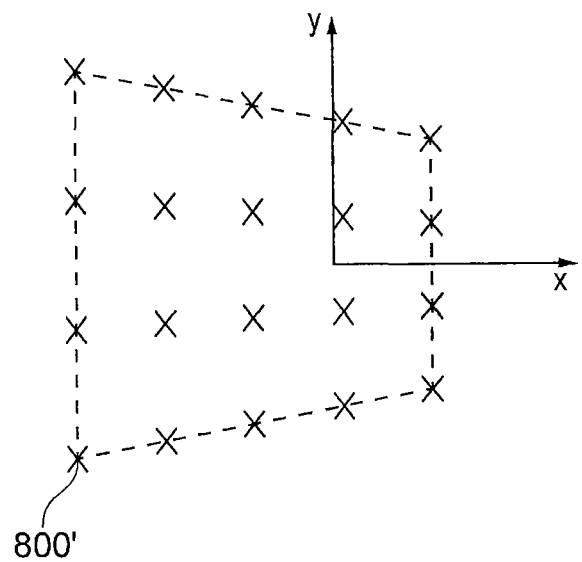
FIGS. 19A-19B show the transformation of the pixel positions of FIGS. 8A-8B so as to correct for fish-eye distortion in the captured image.
Figure 19B:
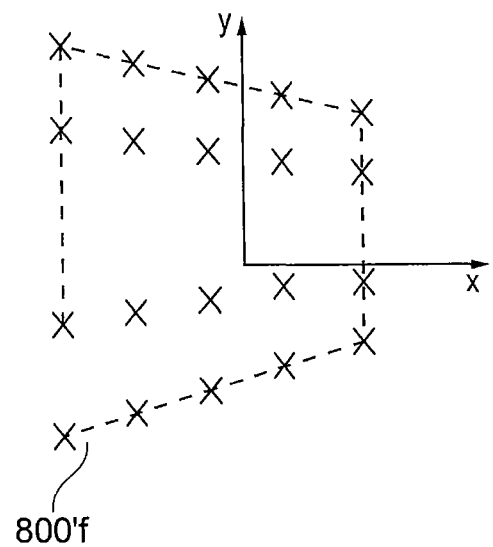

In embodiments, in order to alleviate this problem, the shape of the perspective corrected cut-out 300' can be changed so as to take into account any fish-eye distortion of the image 200. This shape change involves further transforming the pixel positions 800' which define the shape of the perspective corrected cut-out 300' in the x-y plane (see FIG. 8B) so that the shape of the cut-out more closely matches the distorted shape of an object in the fish-eye distorted image 200. For example, in a fish-eye image, lines generally appear curved and objects appear closer to the centre of the image than in a normal, rectilinear image. The pixels positions 800' are thus transformed so that they are closer to the origin of the x-y plane and so that straight lines in the cut-out 300' become curved so as to match the curvature of lines in the fish-eye distorted image 200. Such a transformation is illustrated in FIGS. 19A-B, in which FIG. 19A shows the original pixel positions 800' and FIG. 19B shows transformed pixel positions 800'$_f$.

The pixel positions 800' can be transformed to the pixel positions 800'$_f$ using any suitable method. For example, for a given pixel position 800' of ($c_x'$, $c_y'$), the transformed pixel position 800'$_f$ of ($c_{x,f}'$, $c_{y,f}'$) can be found by applying a suitable scaling factor to each of $c_x'$ and $c_y'$. This scaling factor will be less than one (since images of objects captured by a fish-eye lens appear closer to the centre of the image than objects captured by a non fish-eye lens) and can be calculated in advance for a particular fish-eye lens by calculating the ratio of the distance of a captured object from the centre of an image produced by the fish-eye lens to the distance of that same captured object from the centre of a corresponding rectilinear image (that is, an image produced by an ideal, non-fish eye lens with the same focal length as the particular fish-eye lens which is chosen). For example, this scaling factor may be given by:

$$P_f \times \frac{\sin\left(\frac{a}{P_f}\right)}{\tan a}$$

where $$a = \tan^{-1}\frac{\sqrt{c_x'^2 + c_y'^2}}{F_C}$$

and $P_f$ is a parameter specific to the particular lens being used (the value of $P_f$ may differ for different lens focal lengths, models and/or manufacturers). This value can be obtained automatically from lens metadata. Alternatively, it may be input manually by the user. In experiments, a value of $P_f=1.4$ was found to successively correct for fish-eye distortion for a Nikon® 10.5 mm fish-eye lens. It is noted that α is the angle at which light from an object subtends the lens axis for a non-fish eye lens.

Thus, a transformed pixel position 800'$_f$ of $(c_{x_f}', c_{y_f}')$ may be given by:

$$c_{x_f'} = c_x' \times P_f \times \frac{\sin\left(\frac{a}{P_f}\right)}{\tan a}$$

$$c_{y_f'} = c_y' \times P_f \times \frac{\sin\left(\frac{a}{P_f}\right)}{\tan a}$$

Advantageously, because the shape of the perspective corrected cut-out 300' has been changed so as to take into account the fish-eye distortion of the image 200, when a rectangular, perspective corrected zoomed-in image corresponding to the cut-out 300' is generated, this zoomed-in image will also be corrected for the fish-eye distortion of the image 200. Thus, a fish-eye lens can be used with the camera 104 or cameras 1710, 1715 so as to obtain a wider field of view, whilst at the same time, any undesirable fish-eye effects in the final zoomed-in image generated from the image cut-out 300' are alleviated.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors. Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Clauses

The following numbered paragraphs define features and/or embodiments.

1. A method of generating a cut-out from an image of a scene which has been captured by a camera, the method comprising:

defining the position of a virtual camera, the image plane of the virtual camera being the cut out, with respect to the position of the camera capturing the scene;

defining a set of pixel positions for the cut out of the captured image;

generating a virtual camera rotation matrix to be applied to the defined set of pixel positions, the virtual camera rotation matrix expressing a combination of at least one of the yaw, pitch and roll of the virtual camera;

applying the virtual camera rotation matrix to the defined set of pixel positions to determine a corresponding transformed pixel position for each of the defined pixel positions, the transformed pixel positions defining a shape and position of a portion of the captured image of the scene;

mapping each of the transformed pixel positions in the set of transformed pixel positions to an associated pixel in the portion of the image of the scene; and establishing a value for each one of pixels of the image cut out in the defined pixel positions corresponding to the transformed pixel positions using the value of the corresponding associated pixel in the portion of the image of the scene which has been determined.

2. The method according to clause 1, wherein the virtual camera rotation matrix is calculated in accordance with a product of one or more of matrices associated with one or more of the pitch, yaw and roll of the virtual camera.

3. The method according to clause 2, wherein the virtual camera rotation matrix, V, is given by:

$$V = P_V * Y_V * R_V$$

4. The method according to either one of clauses 2 or 3, wherein:

$$P_V = \begin{bmatrix} 1 & 0 & 0 \\ 0 & \cos\varphi_V & \sin\varphi_V \\ 0 & -\sin\varphi_V & \cos\varphi_V \end{bmatrix}$$

is a pitch rotation matrix, the pitch being defined by an angle $\phi_V$ about the x-axis;

$$Y_V = \begin{bmatrix} \cos\theta_V & 0 & -\sin\theta_V \\ 0 & 1 & 0 \\ \sin\theta_V & 0 & \cos\theta_V \end{bmatrix}$$

is a yaw rotation matrix, the yaw being defined by an angle $\theta_V$ about the y-axis; and $$R_V = \begin{bmatrix} \cos\rho_V & \sin\rho_V & 0 \\ -\sin\rho_V & \cos\rho_V & 0 \\ 0 & 0 & 1 \end{bmatrix}$$

is a roll rotation matrix, the roll being defined by an angle $\rho_V$ about the z-axis.

5. The method according to any one of clauses 2, 3, or 4 wherein:

a defined pixel position for the cut out of the captured image is given by $$s = \begin{bmatrix} s_x \\ s_y \\ s_z \end{bmatrix}$$

wherein $s_x$ and $s_y$ are normalised within a range determined by the ratio of the cut-out with the image of the scene and $s_z$ is determined in accordance with the focal length of the virtual camera 6. The method according to clause 5, wherein $s_x$=x-co-ordinate of the defined pixel position, normalised to be within the range $-n_x$-+$n_x$, wherein $$n_x = \frac{\text{width of cut out}}{\text{width of image of the scene}},$$

$s_y$=y-co-ordinate of the defined pixel position, normalised to be within the range $-rn_x$-+$rn_x$, wherein $$r = \frac{\text{height of cut out}}{\text{height of image of the scene}},$$

and $s_z = -F_y * n_x$, wherein $F_V$=focal length of virtual camera

7. The method according to clause 6 further comprising:

applying the virtual camera rotation matrix to the defined pixel position, s, so as to obtain a transformed pixel position, given by $$c = \begin{bmatrix} c_x \\ c_y \\ c_z \end{bmatrix};$$

and processing the transformed pixel position, c, so as to map the transformed pixel position onto two-dimensional space, the two-dimensional mapped pixel position given by $$c' = \begin{bmatrix} c_x' \\ c_y' \end{bmatrix}$$

wherein $c_x'$ and $c_y'$ are determined in accordance with focal length of the camera capturing the scene.

8. The method according to clause 7, wherein $$c_x' = \frac{c_x}{c_z} * -F_C =$$

x – co – ordinate of the two – dimensional mapped pixel position, normalised to be within the range −1-+1, wherein $F_C$=focal length of the camera capturing the scene, and $$c_y' = \frac{c_y}{c_z} * -F_C =$$

y – co – ordinate of the two – dimensional mapped pixel position, normalised to be within the range −a-+a, wherein $$a = \frac{\text{height of image of the scene}}{\text{width of image of the scene}};$$

wherein $F_V$ and $F_C$ are defined in units such that they are equal to one for a field of view of 90 degrees.

9. The method according to clause 7 or 8, wherein the focal length of the camera capturing the scene, $F_C$ is obtained from lens metadata.

10. The method according to any one of clauses 2 to 9, wherein the yaw $\theta_V$ and pitch $\phi_V$ of the virtual camera is controlled by a user operated controller.

11. The method according to any one of clauses 2 to 10, wherein the yaw $\theta_V$ and pitch $\phi_V$ of the virtual camera is controlled by an object tracking algorithm configured to track an object in the captured image of the scene.

12. The method according to any preceding clause, wherein the roll $\rho_V$ of the virtual camera is calculated in accordance with the angle of pitch of the camera capturing the scene about a predetermined pitch axis and the angle of roll of the camera capturing the scene about a predetermined camera roll axis.

13. The method according to clause 12, wherein the angle of the pitch and/or roll of the camera is determined from a rig upon which the camera capturing the scene is mounted.

14. The method according to either clause 12 or 13, wherein the roll $\rho_V$ of the virtual camera is calculated using the equation:

$$\rho_V = \sin^{-1}(\sin(\theta_V) * \sin(\phi_V + \phi_{rig})) + \rho_{rig}$$

wherein $\phi_{rig}$ defines an angle of pitch of the camera capturing the scene about a predetermined camera pitch axis and $\rho_{rig}$ defines an angle of roll of the camera capturing the scene about a predetermined camera roll axis, the predetermined first camera pitch and roll axes defining a horizontal plane in the scene.

15. A method according to any preceding clause, further comprising:

generating the captured image of the scene as a stitched image captured by a first camera in a first position and a second camera in a second position, the second position being different from the first position.

16. A method according to any preceding clause, wherein the cut-out is corrected for barrel and/or pin cushion distortion in the captured image using lens metadata associated with the camera capturing the image.

18. A method according to any preceding clause, wherein:
the captured image has been captured using a fish-eye lens and is an image comprising fish-eye distortion; and
the transformed pixel positions defining the shape and position of the portion of the captured image of the scene are further transformed so that the shape of the portion of the captured image more closely matches a shape of an object in the fish-eye distorted captured image.

18. A device for generating a cut-out from an image of a scene which has been captured by a camera, the device comprising circuitry configured to:
define the position of a virtual camera, the image plane of the virtual camera being the cut out, with respect to the position of the camera capturing the scene;
define a set of pixel positions for the cut out of the captured image;
generate a virtual camera rotation matrix to be applied to the defined set of pixel positions, the virtual camera rotation matrix expressing a combination of at least one of the yaw, pitch and roll of the virtual camera;
apply the virtual camera rotation matrix to the defined set of pixel positions to determine a corresponding transformed pixel position for each of the defined pixel positions, the transformed pixel positions defining a shape and position of a portion of the captured image of the scene;
map each of the transformed pixel positions in the set of transformed pixel positions to an associated pixel in the portion of the image of the scene; and
establish a value for each one of pixels of the image cut out in the defined pixel positions corresponding to the transformed pixel positions using the value of the corresponding associated pixel in the portion of the image of the scene which has been determined.

19. The device according to clause 18, wherein the virtual camera rotation matrix is calculated in accordance with a product of one or more of matrices associated with one or more of the pitch, yaw and roll of the virtual camera.

20. The device according to clause 19, wherein the virtual camera rotation matrix, V, is given by:

$$V = P_V * Y_V * R_V$$

21. The device according to either one of clauses 18 or 19, wherein:

$$P_V = \begin{bmatrix} 1 & 0 & 0 \\ 0 & \cos\varphi_V & \sin\varphi_V \\ 0 & -\sin\varphi_V & \cos\varphi_V \end{bmatrix}$$

is a pitch rotation matrix, the pitch being defined by an angle $\varphi_V$ about the x-axis;

$$Y_V = \begin{bmatrix} \cos\theta_V & 0 & -\sin\theta_V \\ 0 & 1 & 0 \\ \sin\theta_V & 0 & \cos\theta_V \end{bmatrix}$$

is a yaw rotation matrix, the yaw being defined by an angle $\theta_V$ about the y-axis; and $$R_V = \begin{bmatrix} \cos\rho_V & \sin\rho_V & 0 \\ -\sin\rho_V & \cos\rho_V & 0 \\ 0 & 0 & 1 \end{bmatrix}$$

is a roll rotation matrix, the roll being defined by an angle $\rho_V$ about the z-axis.

22. The device according to any one of clauses 19, 20, or 21 wherein:
a defined pixel position for the cut out of the captured image is given by $$s = \begin{bmatrix} s_x \\ s_y \\ s_z \end{bmatrix}$$

wherein
$s_x$ and $s_y$ are normalised within a range determined by the ratio of the cut-out with the image of the scene and $s_z$ is determined in accordance with the focal length of the virtual camera 23. The device according to clause 22, wherein $s_x$=x-co-ordinate of the defined pixel position, normalised to be within the range $-n_x$-+$n_x$, wherein $$n_x = \frac{\text{width of cut out}}{\text{width of image of the scene}},$$

$s_y$=y-co-ordinate of the defined pixel position, normalised to be within the range $-rn_x$-+$rn_x$, wherein $$r = \frac{\text{height of cut out}}{\text{height of image of the scene}},$$

and $s_z = -F_V * n_x$, wherein $F_V$=focal length of virtual camera

24. The device according to clause 23 wherein the circuitry is further configured to:
apply the virtual camera rotation matrix to the defined pixel position, s, so as to obtain a transformed pixel position, given by $$c = \begin{bmatrix} c_x \\ c_y \\ c_z \end{bmatrix};$$

and process the transformed pixel position, c, so as to map the transformed pixel position onto two-dimensional space, the two-dimensional mapped pixel position given by $$c' = \begin{bmatrix} c_x' \\ c_y' \end{bmatrix}$$

wherein $c_x'$ and $c_y'$ are determined in accordance with focal length of the camera capturing the scene.

25. The device according to clause 24, wherein $$c'_x = \frac{c_x}{c_z} * -F_C =$$

$x$ – co – ordinate of the two – dimensional mapped pixel position, normalised to be within the range −1−+1, wherein $F_C$=focal length of the camera capturing the scene, and $$c'_y = \frac{c_y}{c_z} * -F_C =$$

$y$ – co – ordinate of the two – dimensional mapped pixel position, normalised to be within the range −a−+a, wherein $$a = \frac{\text{height of image of the scene}}{\text{width of image of the scene}};$$

wherein $F_V$ and $F_c$ are defined in units such that they are equal to one for a field of view of 90 degrees.

26. The device according to clause 24 or 25, wherein the focal length of the camera capturing the scene, $F_C$ is obtained from lens metadata.

27. The device according to any one of clauses 19 to 26, wherein the yaw $\theta_V$ and pitch $\phi_V$ of the virtual camera is controlled by a user operated controller.

28. The device according to any one of clauses 19 to 27, wherein the yaw $\theta_V$ and pitch $\phi_V$ of the virtual camera is controlled by an object tracking algorithm configured to track an object in the captured image of the scene.

29. The device according to any one of clauses 18 to 28, wherein the roll $\rho_V$ of the virtual camera is calculated in accordance with the angle of pitch of the camera capturing the scene about a predetermined pitch axis and the angle of roll of the camera capturing the scene about a predetermined camera roll axis.

30. The device according to clause 29, wherein the angle of the pitch and/or roll of the camera is determined from a rig upon which the camera capturing the scene is mounted.

31. The device according to either clause 29 or 30, wherein the roll $\rho_V$ of the virtual camera is calculated using the equation:

$$\rho_V = \sin^{-1}(\sin(\theta_V) * \sin(\phi_V + \phi_{rig})) + \rho_{rig}$$

wherein $\phi_{rig}$ defines an angle of pitch of the camera capturing the scene about a predetermined camera pitch axis and $\rho_{rig}$ defines an angle of roll of the camera capturing the scene about a predetermined camera roll axis, the predetermined first camera pitch and roll axes defining a horizontal plane in the scene.

32. The device according to any one of clauses 18 to 31, further comprising:
generating the captured image of the scene as a stitched image captured by a first camera in a first position and a second camera in a second position, the second position being different from the first position.

33. The device according to any one of clauses 18 to 32, wherein the cut-out is corrected for barrel and/or pin cushion distortion in the captured image using lens metadata associated with the camera capturing the image.

34. A device according to any one of clauses 18-33, wherein:
the captured image has been captured using a fish-eye lens and is an image comprising fish-eye distortion; and
the transformed pixel positions defining the shape and position of the portion of the captured image of the scene are further transformed so that the shape of the portion of the captured image more closely matches a shape of an object in the fish-eye distorted captured image.

33. A computer program product comprising computer readable instructions which, when loaded onto a computer, configure the computer to perform the method according to clause 1.

34. A method, device or computer program product as substantially hereinbefore described with reference to the accompanying drawings.

CROSS REFERENCE TO RELATED APPLICATIONS

The present application claims priority to United Kingdom Application 1306050.4 filed on 4 Apr. 2013 and United Kingdom Application 1316102.0 filed on 10 Sep. 2013, the contents of which being incorporated herein by reference in its entirety.

The invention claimed is:

1. A method, comprising:
determining, by circuitry of a camera that captures an image of a scene, position information of a virtual camera with respect to a position of the camera, the position information including a position and an orientation of the virtual camera, the orientation including a yaw ($\theta_V$), a pitch ($\phi_V$) and a roll ($\rho_V$) of the virtual camera;
generating a cut-out image from the image according to the position information;
determining, by the circuitry, a set of pixel positions for the cut-out image;
generating, by the circuitry, a virtual camera rotation matrix to be applied to the set of pixel positions, the virtual camera rotation matrix expressing a combination of at least one of the yaw, the pitch and the roll;
generating, by the circuitry, a perspective-corrected plane for the cut-out image by applying the virtual camera rotation matrix to the set of pixel positions, the perspective-corrected plane being represented with x, y and z coordinates;
transforming, by the circuitry, the perspective-corrected plane by dividing each of the x and y coordinates by the z coordinate and by zooming-in by a focal length of the camera to determine a corresponding transformed pixel position for each of the set of pixel positions and to generate a set of transformed pixel positions for the set of pixel positions;
mapping, by the circuitry, each of the transformed pixel positions to an associated pixel in a portion of the image; and
establishing, by the circuitry, a value for each pixel of the cut-out image at pixel positions of the set of pixel positions and corresponding to the set of transformed pixel positions using a value of the corresponding associated pixel in the portion of the image, wherein the roll is calculated according to equation (1):

$$\rho_V = \sin^{-1}(\sin(\theta_V) * \sin(\phi_V + \phi_{rig})) + \rho_{rig}, \quad (1)$$

$\phi_{rig}$ is a pitch angle of the camera about a predetermined camera pitch axis, $\rho_{rig}$ is a roll angle of the camera about a predetermined camera roll axis, and the predetermined camera pitch axis and the predetermined camera roll axis define a horizontal plane of the scene.

2. The method according to claim 1, wherein the virtual camera rotation matrix is calculated in accordance with a product of one or more of matrices associated with one or more of the pitch, the yaw and the roll.

3. The method according to claim 2, wherein the virtual camera rotation matrix is represented by V, which is given by:

$$V=P_V*Y_V*R_V$$

wherein $P_V$ is a pitch rotation matrix, $Y_V$ is a yaw rotation matrix, and $R_V$ is a roll rotation matrix.

4. The method according to claim 2, wherein the yaw and the pitch of the virtual camera are controlled by a user operated controller.

5. The method according to claim 2, wherein the yaw and the pitch of the virtual camera are controlled by an object tracking algorithm configured to track an object in the image of the scene.

6. The method according to claim 1, wherein the pitch angle and/or the roll angle of the camera is determined according to a rig upon which the camera is mounted.

7. A method according to claim 1, further comprising:
generating, by the circuitry, the image of the scene as a stitched image captured by a first camera in a first position and a second camera in a second position, the second position being different from the first position.

8. A method according to claim 1, wherein the cut-out image is corrected for barrel and/or pin cushion distortion in the image using lens metadata associated with the camera capturing the image.

9. A method according to claim 1, wherein
the image is captured using a fish-eye lens and includes fish-eye distortion,
the transformed pixel positions define a non-rectangular shape and the position of the portion of the image, and
the transformed pixel positions are further transformed so that the non-rectangular shape of the portion of the image more closely matches a shape of an object in a fish-eye distorted image.

10. An image processing apparatus, comprising:
circuitry configured to:
determine position information of a virtual camera with respect to a position of a camera that captures an image of a scene, the position information including a position and an orientation of the virtual camera, the orientation including a yaw ($\theta_V$), a pitch ($\phi_V$) and a roll ($\rho_V$) of the virtual camera;
generate a cut-out image from the image according to the position information;
determine a set of pixel positions for the cut-out image;
generate a virtual camera rotation matrix to be applied to the set of pixel positions, the virtual camera rotation matrix expressing a combination of at least one of the yaw, the pitch and the roll;
generate a perspective-corrected plane for the cut-out image by applying the virtual camera rotation matrix to the set of pixel positions, the perspective-corrected plane being represented by x, y and z coordinates;
transform the perspective-corrected plane by dividing each of the x and y coordinates by the z coordinate and by zooming-in by a focal length of the camera to determine a corresponding transformed pixel position for each of the set of pixel positions and to generate a set of transformed pixel positions for the set of pixel positions;
map each of the transformed pixel positions to an associated pixel in a portion of the image; and
establish a value for each pixel of the cut-out image at pixel positions of the set of pixel positions and corresponding to the set of transformed pixel positions using a value of the corresponding associated pixel in the portion of the image, wherein
the roll is calculated according to equation (1):

$$\rho_V=\sin^{-1}(\sin(\theta_V)*\sin(\phi_V+\phi_{rig}))+\rho_{rig}, \qquad (1)$$

$\phi_{rig}$ is a pitch angle of the camera about a predetermined camera pitch axis, $\rho_{rig}$ is a roll angle of the camera about a predetermined camera roll axis, and the predetermined camera pitch axis and the predetermined camera roll axis define a horizontal plane of the scene.

11. The image processing apparatus according to claim 10, wherein the virtual camera rotation matrix is calculated in accordance with a product of one or more of matrices associated with one or more of the pitch, the yaw and the roll.

12. The image processing apparatus according to claim 11, wherein the virtual camera rotation matrix is represented by V, which is given by:

$$V=P_V*Y_V*R_V$$

wherein $P_V$ is a pitch rotation matrix, $Y_V$ is a yaw rotation matrix, and $R_V$ is a roll rotation matrix.

13. The image processing apparatus according to claim 11, wherein the yaw and the pitch of the virtual camera are controlled by a user operated controller.

14. The image processing apparatus according to claim 11, wherein the yaw and the pitch of the virtual camera are controlled by an object tracking algorithm configured to track an object in the captured image of the scene.

15. The image processing apparatus according to claim 10, wherein the pitch angle and/or the roll angle of the camera is determined according to a rig upon which the camera is mounted.

16. The image processing apparatus according to claim 10, wherein
the image has been captured using a fish-eye lens and includes fish-eye distortion,
the transformed pixel positions define a non-rectangular shape and the position of the portion of the image, and
the transformed pixel positions are further transformed so that the non-rectangular shape of the portion of the image more closely matches a shape of an object in a fish-eye distorted captured image.

17. A non-transitory computer readable medium including computer program instructions, which when executed by an image processing apparatus including circuitry causes the circuitry to perform a method comprising:
determining position information of a virtual camera with respect to a position of a camera that captures an image of a scene, the position information including a position and an orientation of the virtual camera, the orientation including a yaw ($\theta_V$), a pitch ($\phi_V$) and a roll ($\rho_V$) of the virtual camera;
generating a cut-out image from the image according to the position information;
determining a set of pixel positions for the cut-out image;

generating a virtual camera rotation matrix to be applied to the set of pixel positions, the virtual camera rotation matrix expressing a combination of at least one of the yaw, the pitch and the roll;

generating a perspective-corrected plane for the cut-out image by applying the virtual camera rotation matrix to the set of pixel positions, the perspective-corrected plane being represented with x, y and z coordinates;

transforming the perspective-corrected plane by dividing each of the x and y coordinates by the z coordinate and by zooming-in by a focal length of the camera to determine a corresponding transformed pixel position for each of the set of pixel positions and to generate a set of transformed pixel positions for the set of pixel positions;

mapping each of the transformed pixel positions to an associated pixel in a portion of the image; and establishing a value for each pixel of the cut-out image at pixel positions of the set of pixel positions and corresponding to the set of transformed pixel positions using a value of the corresponding associated pixel in the portion of the image, wherein the roll is calculated according to equation (1):

$$\rho_V = \sin^{-1}(\sin(\theta_V) * \sin(\phi_V + \phi_{rig})) + \rho_{rig}, \quad (1)$$

$\phi_{rig}$ is a pitch angle of the camera about a predetermined camera pitch axis, $\rho_{rig}$ is a roll angle of the camera about a predetermined camera roll axis, and the predetermined camera pitch axis and the predetermined camera roll axis define a horizontal plane of the scene.

* * * * *